United States Patent
Zhang et al.

(10) Patent No.: US 11,290,164 B2
(45) Date of Patent: Mar. 29, 2022

(54) CHANNEL STATE INFORMATION CSI REPORTING METHOD AND APPARATUS

(71) Applicant: HUAWEI TECHNOLOGIES CO., LTD., Guangdong (CN)

(72) Inventors: Ruiqi Zhang, Beijing (CN); Xueru Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/943,347

(22) Filed: Jul. 30, 2020

(65) Prior Publication Data

US 2020/0403668 A1 Dec. 24, 2020

Related U.S. Application Data

(63) Continuation of application No. PCT/CN2019/073882, filed on Jan. 30, 2019.

(30) Foreign Application Priority Data

Jan. 31, 2018 (WO) ................ PCT/CN2018/074837

(51) Int. Cl.
*H04B 7/0456* (2017.01)

(52) U.S. Cl.
CPC ......... *H04B 7/0486* (2013.01); *H04B 7/0478* (2013.01)

(58) Field of Classification Search
CPC .. H04W 72/042; H04W 24/10; H04L 5/0048; H04B 7/0626; H04B 7/0486; H04B 7/0478

See application file for complete search history.

(56) References Cited

U.S. PATENT DOCUMENTS

2007/0254597 A1    11/2007   Li et al.
2016/0065278 A1*   3/2016    Wang ................... H04B 7/0456
                                                        375/267

(Continued)

FOREIGN PATENT DOCUMENTS

CN         102056280 A      5/2011
CN         103905146 A      7/2014

(Continued)

OTHER PUBLICATIONS

Alcatel-Lucent et al.,"Proposals for Further DL MIMO Enhancement",3GPP TSG-RAN WGI#72 R1-130456,St Julians, Malta, Jan. 28-Feb. 1, 2013,Total 3 pages.

*Primary Examiner* — Sung S Ahn
(74) *Attorney, Agent, or Firm* — Womble Bond Dickinson (US) LLP

(57) ABSTRACT

Embodiments of a channel state information (CSI) reporting method and apparatus are disclosed. A method includes: receiving, by a first communications apparatus, reference signals from a second communications apparatus; and performing, by the first communications apparatus, channel measurement based on the reference signals, and sending first CSI to the second communications apparatus in a time unit whose identifier is m, where the first CSI is used to indicate a channel state in a first reference time unit and a channel state in a second reference time unit, where an identifier of the first reference time unit is m−$n_1$, an identifier of the second reference time unit is m−$n_1$−$n_2$, where m, $n_1$, and $n_2$ are integers, and $n_2$ is not equal to 0. This way, matching is improved between CSI applied by a network device and a channel that is at a current moment.

27 Claims, 5 Drawing Sheets

(56) References Cited

U.S. PATENT DOCUMENTS

2019/0229780 A1* 7/2019 Kim ................... H04B 7/0643
2019/0245603 A1* 8/2019 Yum ................... H04B 7/0617

FOREIGN PATENT DOCUMENTS

| | | | |
|---|---|---|---|
| CN | 104641573 A | 5/2015 |
| CN | 106302269 A | 1/2017 |
| CN | 106656280 A | 5/2017 |
| CN | 106941391 A | 7/2017 |
| CN | 107210801 A | 9/2017 |
| CN | 107534533 A | 1/2018 |
| WO | 2017116774 A2 | 7/2017 |
| WO | 2017117777 A1 | 7/2017 |
| WO | 2017123018 A1 | 7/2017 |
| WO | 2017142574 A1 | 8/2017 |

* cited by examiner

CHANNEL STATE INFORMATION CSI REPORTING METHOD AND APPARATUS

CROSS-REFERENCE TO RELATED APPLICATIONS

This application is a continuation of International Application No. PCT/CN2019/073882, filed on Jan. 30, 2019, which claims priority to International Patent Application No. PCT/CN2018/074837, filed on Jan. 31, 2018. The disclosures of the aforementioned applications are hereby incorporated by reference in their entireties.

TECHNICAL FIELD

This application relates to the communications field, and in particular, to a channel state information CSI reporting method and apparatus in the communications field.

BACKGROUND

A multiple-input multiple-output (MIMO) technology is widely used in a communications system. The MIMO technology means that a network device and a terminal device respectively use a plurality of transmit antennas and a plurality of receive antennas, and a relatively high data transmission rate is provided in a multi-layer parallel transmission mode, to improve communication quality. Channel state information (CSI) is used to indicate a channel attribute of a communication link, and accuracy of CSI obtained by the network device determines performance of a MIMO system to a great extent. Usually, in a frequency division duplex (FDD) system or a time division duplex (TDD) system in which channel reciprocity cannot be well satisfied, the terminal device needs to measure the CSI and report the CSI to the network device.

The CSI fed back by the terminal device is relatively sensitive to a delay. Particularly for the terminal device at a relatively high moving speed, because the CSI reflects a channel state at a measurement moment, if moving of the terminal device causes a change of a channel, the CSI received by the network device cannot completely reflect a channel state at a current moment. In this case, if the network device directly applies the CSI fed back by the terminal device, a matching degree between the CSI and a channel that is at the current moment is caused to decrease, and data transmission performance is affected.

SUMMARY

This application provides embodiments of a CSI reporting method and apparatus, to help improve a matching degree between CSI applied by a network device and a channel that is at a current moment, and further improve data transmission performance.

According to a first aspect, a CSI reporting method is provided, and includes: receiving, by a first communications apparatus, reference signals from a second communications apparatus; and performing, by the first communications apparatus, channel measurement based on the reference signals, and sending first CSI to the second communications apparatus in a time unit whose identifier is m, where the first CSI is used to indicate a channel state in a first reference time unit and a channel state in a second reference time unit, where an identifier of the first reference time unit is $m-n_1$, an identifier of the second reference time unit is $m-n_1-n_2$, m, $n_1$, and $n_2$ are integers, and $n_2$ is not equal to 0.

According to the CSI reporting method in this embodiment of this application, the first communications apparatus may feed back channel states in at least two time units to the second communications apparatus in one CSI feedback, so that the second communications apparatus estimates CSI to be applied. This helps improve a matching degree between the CSI applied by the second communications apparatus and a channel that is at a current moment, thereby improving data transmission performance.

In one embodiment, both $n_1$ and $n_2$ are less than 0. That is, both the first reference time unit and the second reference time unit are time units after the time unit whose identifier is m. The first communications apparatus may predict channel state information in the first reference time unit and the second reference time unit, and directly sends a prediction result, namely, the first CSI, to the second communications apparatus in the time unit whose identifier is m. After obtaining the first CSI, the second communications apparatus may determine the channel state information in the first reference time unit and the second reference time unit, and does not need to further estimate the channel state information. In addition, the second communications apparatus may further estimate channel state information at another moment based on the channel state in the first reference time unit and the channel state in the second reference time unit, to transmit data at the another moment. This improves a matching degree between CSI and a channel that is at a data transmission moment, and improves transmission performance.

In this embodiment of this application, $m-n_1$ is not equal to $m-n_1-n_2$. That is, the first reference time unit is different from the second reference time unit. It should be understood that, a time unit may be a subframe (or a frame), a slot, or a symbol. This is not limited in this embodiment of this application. Therefore, an identifier of the time unit may be specifically an identifier of the subframe, the slot, or the symbol. The identifier of the symbol is used as an example. In one resource unit (including one or more resource blocks (RB)), identifiers of symbols may be 0 to 6 (or 1 to 7), or may be 0 to 13 (or 1 to 14).

Generally, identifiers of time units are cyclic. For example, in each resource unit, identifiers of symbols are 0 to 13. For a plurality of resource units, identifiers of symbols are sequentially 0 to 13, 0 to 13, ..., 0 to 13, and the like. If an identifier of a time unit is a negative value, the time unit is a time unit corresponding to the value during forward recursion from a resource unit corresponding to a current moment. For example, based on the foregoing definition, an identifier of a time unit may be −2. If a resource unit corresponding to a current moment is the second resource unit in resource units corresponding to identifiers of symbols, that is, 0 to 13, 0 to 13, ..., and 0 to 13, during forward recursion, a time unit whose identifier is −2 represents a time unit that is in the first resource unit and whose identifier is 12. In this embodiment of this application, m is an integer, and represents an identifier of a time unit at a current CSI reporting moment. $m-n_1$ and $m-n_1-n_2$ may be positive integers, or may be negative integers. This is not limited in this embodiment of this application.

In one embodiment, the reference time unit may be represented by using a reference resource. The reference resource may usually include a time domain resource and a frequency domain resource. The time domain resource is the reference time unit. However, this is not limited in this embodiment of this application.

It should be further understood that, the first communications apparatus may be a terminal device, and the second communications apparatus may be a network device. However, this is not limited in this embodiment of this application. In a specific implementation, the reference signal is a channel state information-reference signal (CSI-RS).

When the first communications apparatus feeds back the first CSI, a single codebook structure or a double codebook structure, namely, a two-stage codebook, may be used for the first CSI. This is not limited in this embodiment of this application. It should be understood that, in this specification, a superscript (1) is used to indicate a parameter corresponding to the first reference time unit, and a superscript (2) is used to indicate a parameter corresponding to the second reference time unit. Other superscripts are similar, and are not listed one by one herein.

In one embodiment, the first CSI includes a first precoding matrix indicator PMI, a second PMI, and a third PMI, where the first PMI is used to indicate a matrix $w_1$ corresponding to the first reference time unit and the second reference time unit, the second PMI is used to indicate a matrix $W_2^{(1)}$ corresponding to the first reference time unit, the third PMI is used to indicate a matrix $W_2^{(2)}$ corresponding to the second reference time unit, a precoding matrix corresponding to the first reference time unit satisfies $W^{(1)} = W_1 \times W_2^{(1)}$, and a precoding matrix corresponding to the second reference time unit satisfies $W^{(2)} = W_1 \times W_2^{(2)}$.

Specifically, in this specification, a precoding matrix indicator (PMI) is used to indicate, from a predefined codebook, a precoding matrix recommended by the first communications apparatus and used for data transmission, a PMI is used to indicate a channel matrix of the first communications apparatus, a PMI is used to indicate a channel matrix of one or some receive antenna ports of the first communications apparatus, a PMI is used to indicate a correlation matrix of a channel matrix of the first communications apparatus, or a PMI is used to indicate at least one eigenvector of a correlation matrix of a channel matrix of the first communications apparatus.

The first CSI may include the first PMI, the second PMI, and the third PMI. The first PMI is used to indicate the matrix $w_1$. $w_1$ is applicable to both the first reference time unit and the second reference time unit. The second PMI is used to indicate the matrix $W_2^{(1)}$ corresponding to the first reference time unit. The third PMI is used to indicate the matrix $W_2^{(2)}$ corresponding to the second reference time unit.

That the PMI indicates the precoding matrix is used as an example. When receiving the first CSI of the double codebook structure, the second communications apparatus may calculate the precoding matrix $W^{(1)}$ of the first reference time unit based on $w_1$ and $W_2^{(1)}$, and calculate the precoding matrix $w^{(2)}$ of the second reference time unit based on $w_1$ and $W_2^{(2)}$. Because $w_1$ is the same in entire communication bandwidth, the first communications apparatus may feed back CSI of the foregoing double codebook structure, to reduce feedback overheads.

That the PMI indicates at least one eigenvector of a spatial correlation matrix of the channel matrix is used as an example. When receiving the first CSI of the double codebook structure, the second communications apparatus may calculate, based on $w_1$ and $W_2^{(1)}$, the matrix $w^{(1)}$ including at least one eigenvector of the first reference time unit, and calculate, based on $w_1$ and $W_2^{(2)}$, the matrix $w^{(2)}$ including at least one eigenvector of the second reference time unit. One column of the matrix $w^{(1)}$ represents one eigenvector. One column of the matrix $w^{(2)}$ also represents one eigenvector.

That the PMI indicates the channel matrix is used as an example. The second communications apparatus may calculate the channel matrix $w^{(1)}$ of the first reference time unit based on $w_1$ and $W_2^{(1)}$, and calculate the channel matrix $w^{(2)}$ of the second reference time unit based on $w_1$ and $W_2^{(2)}$. When the PMI indicates the channel matrix, in one embodiment, one column of the matrix $w^{(1)}$ may represent a channel vector of one antenna port of the first communications apparatus in the first reference time unit, and one column of the matrix $w^{(2)}$ may also represent a channel vector of the antenna port of the first communications apparatus in the second reference time unit. That the PMI indicates the precoding matrix is used an example for description below. Details of another case are not described again.

The third PMI may be directly used to indicate the matrix $W_2^{(2)}$ corresponding to the second reference time unit, or may be used to indicate a relative amplitude value and/or a relative phase value in the matrix $W_2^{(1)}$ and the matrix $W_2^{(2)}$. This is not limited in this embodiment of this application. However, it should be understood that, CSI feedback overheads of the first communications apparatus can be further reduced by using the relative amplitude value and/or the relative phase value.

Specifically, the matrix $w_1$ is a diagonal block matrix. To be specific, $$W_1 = \begin{bmatrix} A & 0 \\ 0 & A \end{bmatrix}.$$

The matrix A includes l column vectors, where $l \geq 1$, and $A = [b_0 \ b_1 \ L \ b_{l-1}]$. $b_s$ is a column vector whose length is $N_t/2$, where $N_t$ is a positive integer, and $s \in \{0,1,L,l-1\}$. The matrix $W_2^{(1)}$ and the matrix $W_2^{(2)}$ each are a matrix of 2l rows and N columns, where both l and N are positive integers. $W_2^{(1)}$ and $W_2^{(2)}$ may be classified into a first-type codebook and a second-type codebook based on a representation form.

For the first-type codebook, a representation form of an $n^{th}$ column of $W_2^{(1)}$ is $$W_2^{(1)}(n) = \begin{bmatrix} e_k \\ c_n^{(1)} e_k \end{bmatrix},$$

and a representation form of an $n^{th}$ column of $W_2^{(2)}$ is $$W_2^{(2)}(n) = \begin{bmatrix} e_k \\ c_n^{(2)} e_k \end{bmatrix},$$

where $n \in \{1,2,L,N-1\}$, $e_k$ is a l×1 column vector. A $k^{th}$ element of $e_k$ is 1, and a remaining element is 0. Both $c_n^{(1)}$ and $c_n^{(2)}$ are complex numbers whose modulus is 1, and may be represented as $$c_n^{(1)} = e^{j\varphi_n^{(1)}} \text{ and } c_n^{(2)} = e^{j\varphi_n^{(2)}},$$

where $\varphi_n^{(1)}$ represents a phase of the complex number $c_n^{(1)}$, and $\varphi_n^{(2)}$ represents a phase of the complex number $c_n^{(2)}$.

For the second-type codebook, a representation form of $W_2^{(1)}$ is:

$$W_2^{(1)} = \begin{bmatrix} h_{0,1,1} \cdot p_{0,1,1}^{(1)} \cdot c_{0,1,1}^{(1)} & & h_{0,N,1} \cdot p_{0,N,1}^{(1)} \cdot c_{0,N,1}^{(1)} \\ h_{0,1,2} \cdot p_{0,1,2}^{(1)} \cdot c_{0,1,2}^{(1)} & & h_{0,N,2} \cdot p_{0,N,2}^{(1)} \cdot c_{0,N,2}^{(1)} \\ M & & M \\ h_{0,1,l} \cdot p_{0,1,l}^{(1)} \cdot c_{0,1,l}^{(1)} & & h_{0,N,l} \cdot p_{0,N,l}^{(1)} \cdot c_{0,N,l}^{(1)} \\ h_{1,1,1} \cdot p_{1,1,1}^{(1)} \cdot c_{1,1,1}^{(1)} & L & h_{1,N,l} \cdot p_{1,N,l}^{(1)} \cdot c_{1,N,l}^{(1)} \\ h_{1,1,2} \cdot p_{1,1,2}^{(1)} \cdot c_{1,1,2}^{(1)} & & h_{1,N,2} \cdot p_{1,N,2}^{(1)} \cdot c_{1,N,2}^{(1)} \\ M & & M \\ h_{1,1,l} \cdot p_{1,1,l}^{(1)} \cdot c_{1,1,l}^{(1)} & & h_{1,N,l} \cdot p_{1,N,l}^{(1)} \cdot c_{1,N,l}^{(1)} \end{bmatrix},$$

where $h_{x,y,z}$ and $p_{x,y,z}^{(1)}$ are real numbers, $c_{x,y,z}^{(1)}$ is a complex number whose modulus is 1, and $$c_{x,y,z}^{(1)} = e^{j\varphi_{x,y,z}^{(1)}},$$

where $\varphi_{x,y,z}^{(1)}$ represents a phase of the complex number $c_{x,y,z}^{(1)}$, x and z represent row numbers of $W_2^{(1)}$ and $W_2^{(2)}$, y represents column numbers of $W_2^{(1)}$ and $W_2^{(2)}$, $x \in \{0,1\}$, $y \in \{1,2,L,N\}$ and $z \in \{1,2,L,l\}$.

A representation form of $W_2^{(2)}$ is:

$$W_2^{(2)} = \begin{bmatrix} h_{0,1,1} \cdot p_{0,1,1}^{(2)} \cdot c_{0,1,1}^{(2)} & & h_{0,N,1} \cdot p_{0,N,1}^{(2)} \cdot c_{0,N,1}^{(2)} \\ h_{0,1,2} \cdot p_{0,1,2}^{(2)} \cdot c_{0,1,2}^{(2)} & & h_{0,N,2} \cdot p_{0,N,2}^{(2)} \cdot c_{0,N,2}^{(2)} \\ M & & M \\ h_{0,1,l} \cdot p_{0,1,l}^{(2)} \cdot c_{0,1,l}^{(2)} & & h_{0,N,l} \cdot p_{0,N,l}^{(2)} \cdot c_{0,N,l}^{(2)} \\ h_{1,1,1} \cdot p_{1,1,1}^{(2)} \cdot c_{1,1,1}^{(2)} & L & h_{1,N,l} \cdot p_{1,N,l}^{(2)} \cdot c_{1,N,l}^{(2)} \\ h_{1,1,2} \cdot p_{1,1,2}^{(1)} \cdot c_{1,1,2}^{(1)} & & h_{1,N,2} \cdot p_{1,N,2}^{(2)} \cdot c_{1,N,2}^{(2)} \\ M & & M \\ h_{1,1,l} \cdot p_{1,1,l}^{(2)} \cdot c_{1,1,l}^{(2)} & & h_{1,N,l} \cdot p_{1,N,l}^{(2)} \cdot c_{1,N,l}^{(2)} \end{bmatrix},$$

where $h_{x,y,z}$ and $P_{x,y,z}^{(2)}$ are real numbers, $c_{x,y,z}^{(2)}$ is a complex number whose modulus is 1, and $$c_{x,y,z}^{(2)} = e^{j\varphi_{x,y,z}^{(2)}},$$

where $\varphi_{x,y,z}^{(2)}$ represents a phase of the complex number $c_{x,y,z}^{(2)}$, x and z represent row numbers of $W_2^{(1)}$ and $W_2^{(2)}$, y represents column numbers of $W_2^{(1)}$ and $W_2^{(2)}$, $x \in \{0,1\}$, $y \in \{1,2,L,N\}$, and $z \in \{1,2,L,l\}$.

In one embodiment, for the first-type codebook, the third PMI is used to indicate a relative phase value $\Delta c_n$, and the relative phase value $\Delta c_n$ is specifically used to represent a relative value between $c_n^{(2)}$ in the $n^{th}$ column in $W_2^{(2)}$ and a coefficient $c_n^{(1)}$ at a corresponding location in $W_2^{(1)}$.

In one embodiment, $\Delta c_n = \varphi_n^{(1)} - \varphi_n^{(2)}$, or $\Delta c_n = \varphi_n^{(2)} - \varphi_n^{(1)}$.

In one embodiment, for the second-type codebook, the third PMI is used to indicate a relative amplitude value $\Delta p_{x,y,z}$, and the relative amplitude value $\Delta p_{x,y,z}$ is specifically used to represent a relative value between an amplitude coefficient $p_{x,y,z}^{(2)}$ in an $(x \times l + z)^{th}$ row and a $y^{th}$ column in $W_2^{(2)}$ and an amplitude coefficient $p_{x,y,z}^{(1)}$ at a corresponding location in $W_2^{(1)}$; and/or the third PMI is used to indicate a relative phase value $\Delta c_{x,y,z}$, and the relative phase value $\Delta c_{x,y,z}$ is specifically used to represent a relative value between a phase coefficient $c_{x,y,z}^{(1)}$ at a in the $(x \times l + z)^{th}$ row and the $y^{th}$ column in $W_2^{(2)}$ and a phase coefficient $c_{x,y,z}^{(1)}$ at a corresponding location in $W_2^{(1)}$, where the matrices $W_2^{(1)}$ and $W_2^{(2)}$ each are a matrix of 2l rows and N columns, both l and N are positive integers, x and z represents row numbers of $W_2^{(1)}$ and $W_2^{(2)}$, y represents column numbers of $W_2^{(1)}$ and $W_2^{(2)}$, $x \in \{0,1\}$, $z \in \{1,2,L,l\}$, and $y \in \{1,2,L,N\}$.

It should be understood that, a relative value may represent a subtraction operation, or may represent a division operation. That is, the relative amplitude value $\Delta p_{x,y,z}$ may be a difference between $p_{x,y,z}^{(2)}$ and $p_{x,y,z}^{(1)}$, or may be a ratio of $p_{x,y,z}^{(2)}$ to $p_{x,y,z}^{(1)}$. The relative phase value $\Delta c_{x,y,z}$ is similar to the relative amplitude value $\Delta p_{x,y,z}$. This is not limited in this embodiment of this application. However, it should be understood that, a specific calculation manner needs to be agreed on in a protocol, or is configured by the second communications apparatus for the first communications apparatus by using signaling.

In one embodiment, $\Delta p_{x,y,z} = p_{x,y,z}^{(1)}/p_{x,y,z}^{(2)}$, or $\Delta p_{x,y,z} = p_{x,y,z}^{(2)}/p_{x,y,z}^{(1)}$.

In one embodiment, if $$c_{x,y,z}^{(1)} = e^{j\varphi_{x,y,z}^{(1)}}, \text{ and } c_{x,y,z}^{(2)} = e^{j\varphi_{x,y,z}^{(2)}},$$

$\Delta c_{x,y,z} = \varphi_{x,y,z}^{(1)} - \varphi_{x,y,z}^{(2)}$, or $\Delta c_{x,y,z} = \varphi_{x,y,z}^{(2)} - \varphi_{x,y,z}^{(1)}$, where $j^2 = -1$.

It should be understood that, in this embodiment of this application, in addition to feeding back the first CSI to the second communications apparatus, the first communications apparatus may further feed back second CSI to the second communications apparatus. The second CSI is used to indicate a channel state in a time unit whose identifier is q. During specific implementation, the second CSI may be obtained by the first communications apparatus by performing channel measurement prediction based on the reference signals, or may be obtained by the first communications apparatus by performing prediction based on the first CSI. This is not limited in this embodiment of this application.

In one embodiment, the first CSI includes a first PMI, a second PMI, a third PMI, and a sixth PMI, where the first PMI is used to indicate a matrix $w_1$ corresponding to the first reference time unit and the second reference time unit, the sixth PMI is used to indicate a matrix $W_3$ corresponding to the first reference time unit and the second reference time unit, the second PMI is used to indicate a matrix $w_2^{(1)'}$ corresponding to the first reference time unit, the third PMI is used to indicate a matrix $w_2^{(2)'}$ corresponding to the second reference time unit, a precoding matrix corresponding to the first reference time unit satisfies way $w^{(1)'} = w_1 \times w_2^{(1)'} \times w_3$, and a precoding matrix corresponding to the second reference time unit satisfies $w^{(2)'} = w_1 \times w_2^{(2)'} \times w_3$.

Specifically, a PMI is used to indicate, from a predefined codebook, a precoding matrix that is of at least one layer of data and that is recommended by the first communications apparatus and is used for data transmission, a PMI is used to indicate a channel matrix of at least one antenna port of the first communications apparatus, a PMI is used to indicate a spatial correlation matrix of a channel matrix of at least one antenna port of the first communications apparatus, or a PMI is used to indicate at least one eigenvector of the spatial correlation matrix of the first communications apparatus.

The first CSI may include the first PMI, the second PMI, the third PMI, and the sixth PMI. The first PMI is used to indicate the matrix $w_1$. $w_1$ is applicable to both the first reference time unit and the second reference time unit. The second PMI is used to indicate the matrix $w_2^{(1)'}$ corresponding to the first reference time unit. The third PMI is used to indicate the matrix $w_2^{(2)'}$ corresponding to the second reference time unit. The sixth PMI is used to indicate the matrix $W_3$. $W_3$ is applicable to both the first reference time unit and the second reference time unit.

Specifically, the matrix $w_1$ is a diagonal block matrix. To be specific, $$W_1 = \begin{bmatrix} A & 0 \\ 0 & A \end{bmatrix}.$$

The matrix A includes 1 column vectors, where l≥1, and $A=[b_0\ b_1\ L\ b_{l-1}]$. $b_s$ is a column vector whose length is $N_t/2$, $N_t$ is a positive integer. $s \in \{0,1,L,l-1\}$. $w_3 = [f_0^T f_1^T L f_{N''-1}^T]^T$, is a matrix of N" rows and F columns, and includes N" vectors $f_0, f_1, \ldots,$ and $f_{N''-1}$. Each vector $f_i$ is a row vector whose length is F, where $i=0, 1, \ldots,$ and N"−1, and N" is a positive integer.

For example, forms of $w_2^{(1)'}$ and $w_2^{(2)'}$ may be similar to those of $W_2^{(1)}$ and $W_2^{(2)}$. x and z represent row numbers, and y represents column numbers.

In one embodiment, the third PMI is used to indicate a relative amplitude value $\Delta p_{x,y,z}$, and the relative amplitude value $\Delta p_{x,y,z}$ is specifically used to represent a relative value between an amplitude coefficient $p_{x,y,z}^{(2)}$ in an $(x \times l + z)^{th}$ row and $y^{th}$ column in $w_2^{(2)'}$ and an amplitude coefficient $p_{x,y,z}^{(1)}$ at a corresponding location in $w_2^{(1)'}$; and/or the third PMI is used to indicate a relative phase value $\Delta c_{x,y,z}$, and the relative phase value $\Delta c_{x,y,z}$ is specifically used to represent a relative value between a phase coefficient $c_{x,y,z}^{(2)}$ in the $(x \times l + z)^{th}$ row and the $y^{th}$ column in $w_2^{(1)'}$ and a phase coefficient $c_{x,y,z}^{(1)}$ at a corresponding location in $w_2^{(1)'}$, where the matrices $w_2^{(1)'}$ and $w_2^{(2)'}$ each are a matrix of 2l rows and N" columns, l and N" are both positive integers x and z represent row numbers of $w_2^{(1)'}$ and $w_2^{(2)'}$, y represents column numbers of $w_2^{(1)'}$ and $w_2^{(2)'}$, $x \in \{0,1\}$, $z \in \{1,2,L,l\}$, and $y \in \{1,2,L,N''\}$.

For example, a form of $w_2^{(t)'}$ (t=1, or t=2) is:

$$w_2^{(t)'} = \begin{bmatrix} p_{0,0}^{(t)} c_{0,0}^{(t)} & p_{0,1}^{(t)} c_{0,1}^{(t)} & L & p_{0,N''-1}^{(t)} c_{0,N''-1}^{(t)} \\ p_{1,0}^{(t)} c_{1,0}^{(t)} & p_{1,1}^{(t)} c_{1,1}^{(t)} & L & p_{0,N''-1}^{(t)} c_{0,N''-1}^{(t)} \\ M & M & O & M \\ p_{2l-1,0}^{(t)} c_{2l-1,0}^{(t)} & p_{2l-1,1}^{(t)} c_{2l-1,1}^{(t)} & L & p_{2l-1,N''-1}^{(t)} c_{2l-1,N''-1}^{(t)} \end{bmatrix},$$

where $p_{x,y}^{(t)}$ is a real number, $c_{x,y}^{(t)}$ is a complex number whose modulus is 1, and $$c_{x,y}^{(t)} = e^{j\varphi_{x,y}^{(t)}},$$

where $\varphi_{x,y}^{(t)}$ represents a phase of the complex number $c_{x,y}^{(t)}$, x represents a row number of $W_2^{(1)}$ or $W_2^{(2)}$, y represents a column number of $w_2^{(1)'}$ or $w_2^{(2)'}$, $x \in \{0,1,2,L, 2l-1\}$, and $y \in \{0,1,L, N''-1\}$.

In one embodiment, F is a quantity of frequency domain units included in reporting bandwidth for the first CSI, and N"<F. In one embodiment, the frequency domain unit may be a subband, a subcarrier, or a resource block (resource block, RB), or may be in another form. This is not limited in this embodiment.

In one embodiment, the third PMI is used to indicate a relative amplitude value $\Delta p_{x,y}$, and the relative amplitude value $\Delta p_{x,y}$ is specifically used to represent a relative value between an amplitude coefficient $p_{x,y}^{(2)}$ in an $(x+1)^{th}$ row and a $(y+1)^{th}$ column in $w_2^{(2)'}$ and an amplitude coefficient $\Delta p_{x,y}$ at a corresponding location in $w_2^{(1)'}$; and/or the third PMI is used to indicate a relative phase value $\Delta c_{x,y}$, and the relative phase value $\Delta c_{x,y}$ is specifically used to represent a relative value between a phase coefficient $c_{x,y}^{(2)}$ in the $(x+1)^{th}$ row and the $(y+1)^{th}$ column in $w_2^{(2)'}$ and a phase coefficient $c_{x,y}^{(1)}$ at a corresponding location in $w_2^{(1)'}$, where the matrices $w_2^{(1)'}$ and $w_2^{(2)'}$ each are a matrix of 2l rows and N" columns, l and N" are both positive integers, x represents row numbers of $w_2^{(1)'}$ and $w_2^{(2)'}$, y represents column numbers of $w_2^{(1)'}$ and $w_2^{(2)'}$; $x \in \{0,1,L,2l-1\}$, and $y \in \{0,1,L,N''-1\}$.

It should be understood that, that x and z represent row numbers and y represents a column number is used as an example for description below. Details of another case are not described again. It should be further understood that, alternatively, x may represent row numbers of $W_2^{(1)}$ and $W_2^{(2)}$, and y may represent column numbers of $W_2^{(1)}$ and $W_2^{(2)}$. Details are not described in this specification again.

In one embodiment, the method further includes: determining, by the first communications apparatus based on the second PMI and the third PMI, a matrix $W_2^{(q)}$ and $w_2^{(q)'}$ that corresponds to a time unit whose identifier is q, where a precoding matrix corresponding to the time unit whose identifier is q satisfies $W^{(q)} = W_1 W_2^{(q)}$ or $w^{(q)'} = w_1 \times w_2^{(q)'} \times W_3$, the matrix $W_2^{(q)}$ is a matrix of 2l rows and N' columns, the matrix $w_2^{(q)'}$ is a matrix of 2l rows and N" columns, q is a positive integer greater than $m-n_1$ and $m-n_1-n_2$, and N' and N" are positive integers; determining, by the first communications apparatus based on $W_2^{(q)}$, a second CQI in the time unit whose identifier is q; and sending, by the first communications apparatus, second CSI to the second communications apparatus, where the second CSI includes the second CQI.

Specifically, the first communications apparatus may determine, based on the second PMI and the third PMI that are included in the first CSI, the matrix $W_2^{(q)}$ or $w_2^{(q)'}$ that corresponds to the time unit whose identifier is q, then determine, based on $W_2^{(q)}$ or $w_2^{(q)'}$, the second CQI in the time unit whose identifier is q, and then send the second CQI to the second communications apparatus. The matrix $W_2^{(q)}$ is a matrix of 2l rows and N' columns. Because $w_2^{(q)'}$ and $W_2^{(q)}$ are similar, $W_2^{(q)}$ is used as an example for description subsequently, and details of determining of $w_2^{(q)'}$ are not described again.

In one embodiment, $W_2^{(q)}$ is determined based on the second PMI, the third PMI, and an amplitude coefficient $p_{x,y,z}^{(q)}$ in an $(x \times l + z)^{th}$ row and a $y'^{th}$ column in $W_2^{(q)}$ and/or a phase coefficient $c_{x,y,z}^{(q)}$ in the $(x \times l + z)^{th}$ row and the $y'^{th}$ column in $W_2^{(q)}$, where $p_{x,y',z}^{(q)}$ and $c_{x,y',z}^{(q)}$ are calculated by using the following formulas:

$$p_{x,y',z}^{(q)} = p_{x,y',z}^{(1)} \times (\Delta p_{x,y',z})^Y, \text{ and}$$

-continued $$c_{x,y',z}^{(q)} = e^{j\left(\varphi_{x,y',z}^{(1)} + Y \times \Delta c_{x,y',z}\right)},$$

where

Y represents a ratio of a difference between the identifier q and the identifier of the first reference time unit to a difference between the identifier of the first reference time unit and the identifier of the second reference time unit y'∈{1, 2,L N'}, and N'≤N.

In one embodiment, $\Delta p_{x,y,z} = p_{x,y,z}^{(1)} - p_{x,y,z}^{(2)}$, or $\Delta p_{x,y,z} = p_{x,y,z}^{(2)} - p_{x,y,z}^{(1)}$.

In one embodiment, $\Delta c_{x,y,z} = c_{x,y,z}^{(1)} - c_{x,y,z}^{(2)}$, or $\Delta c_{x,y,z} = c_{x,y,z}^{(2)} - c_{x,y,z}^{(1)}$.

In one embodiment, $W_2^{(q)}$ is determined based on the second PMI, the third PMI, and an amplitude coefficient $p_{x,y',z}^{(q)}$ in the $(x \times l + z)^{th}$ row and the $y'^{th}$ column in $W_2^{(q)}$ and/or a phase coefficient $c_{x,y',z}^{(q)}$ in the $(x \times l + z)^{th}$ row and the $y'^{th}$ column in $W_2^{(q)}$, where $p_{x,y',z}^{(q)}$ and $c_{x,y',z}^{(q)}$ are calculated by using the following formulas:

$$p_{x,y',z}^{(q)} = p_{x,y',z}^{(1)} + Y \times \Delta p_{x,y',z}, \text{ and}$$

$$c_{x,y',z}^{(q)} = c_{x,y',z}^{(1)} + Y \times \Delta c_{x,y',z}, \text{ where}$$

Y represents a ratio of a difference between the identifier q and the identifier of the first reference time unit to a difference between the identifier of the first reference time unit and the identifier of the second reference time unit y'∈{1,2,L N'}, and N'≤N.

In one embodiment, $W_2^{(q)}$ is determined based on the second PMI, the third PMI, and an amplitude coefficient $p_{x,y',z}^{(q)}$ in the $(x \times l + z)^{th}$ row and the $y'^{th}$ column in $W_2^{(q)}$ and/or a phase coefficient $c_{x,y',z}^{(q)}$ in the $(x \times l + z)^{th}$ row and the $y'^{th}$ column in $W_2^{(q)}$, where $p_{x,y',z}^{(q)}$ and $c_{x,y',z}^{(q)}$ are calculated by using the following formulas:

$$p_{x,y',z}^{(q)} = p_{x,y',z}^{(1)} + Y \times \Delta p_{x,y',z}, \text{ and}$$

$$c_{x,y',z}^{(q)} = e^{j\left(\varphi_{x,y',z}^{(1)} + Y \times \Delta c_{x,y',z}\right)},$$

where

Y represents a ratio of a difference between the identifier q and the identifier of the first reference time unit to a difference between the identifier of the first reference time unit and the identifier of the second reference time unit y'∈{1,2,L N'}, and N'≤N.

In one embodiment, $W_2^{(q)}$ is determined based on the second PMI, the third PMI, and an amplitude coefficient $p_{x,y',z}^{(q)}$ in the $(x \times l + z)^{th}$ row and the $y'^{th}$ column in $W_2^{(q)}$ and/or a phase coefficient $c_{x,y',z}^{(q)}$ in the $(x \times l + z)^{th}$ row and the $y'^{th}$ column in $W_2^{(q)}$, where $p_{x,y',z}^{(q)}$ and $c_{x,y',z}^{(q)}$ are calculated by using the following formulas:

$$p_{x,y',z}^{(q)} = p_{x,y',z}^{(1)} \times (\Delta p_{x,y',z})^Y, \text{ and}$$

$$c_{x,y',z}^{(q)} = c_{x,y',z}^{(1)} + Y \times \Delta c_{x,y',z}, \text{ where}$$

Y represents a ratio of a difference between the identifier q and the identifier of the first reference time unit to a difference between the identifier of the first reference time unit and the identifier of the second reference time unit y'∈{1,2,L N'}, and N'≤N.

In one embodiment, the first CSI includes a fourth PMI and a fifth PMI, where the fourth PMI is used to indicate the precoding matrix $w^{(1)}$ corresponding to the first reference time unit, and the fifth PMI is used to indicate the precoding matrix $w^{(2)}$ corresponding to the second reference time unit.

Specifically, in a single codebook structure, the first CSI may directly include the fourth PMI used to indicate $w^{(1)}$ and the fifth PMI used to indicate $w^{(2)}$. The first communications apparatus reports the first CSI of the single codebook structure to the second communications apparatus. After receiving the first CSI, the second communications apparatus may directly determine, based on the first CSI, the precoding matrix $w^{(1)}$ corresponding to the first reference time unit and the precoding matrix $w^{(2)}$ corresponding to the second reference time unit, so that calculation complexity for the second communications apparatus is reduced.

In one embodiment, the fifth PMI is used to indicate a relative coefficient value $\Delta w_{r,t}$ and the relative coefficient value $\Delta w_{r,t}$ is specifically used to represent a relative value between a coefficient $w_{r,t}^{(2)}$ in an $r^{th}$ row and a $t^{th}$ column in $w^{(2)}$ and a coefficient $w_{r,t}^{(1)}$ at a corresponding location in $w^{(1)}$, where the matrices $w^{(1)}$ and $w^{(2)}$ each are a matrix of $N_t$ rows and N columns, both $N_t$ and N are positive integers, r represents row numbers of $w^{(1)}$ and $w^{(2)}$, t represents column numbers of $w^{(1)}$ and $w^{(2)}$, r∈{1,2,L,$N_t$}, and t∈{1, 2,L,N}.

It should be understood that, a relative value may represent a subtraction operation, or may represent a division operation. That is, the relative coefficient value $\Delta w_{r,t}$ may be a difference between $w_{r,t}^{(2)}$ and $w_{r,t}^{(1)}$, or may be a ratio of $w_{r,t}^{(2)}$ to $w_{r,t}^{(1)}$. However, it should be understood that, a specific calculation manner needs to be agreed on in a protocol, or is configured by the second communications apparatus for the first communications apparatus by using signaling.

In one embodiment, the method further includes: determining, by the first communications apparatus based on the fourth PMI and the fifth PMI, a matrix $W_2^{(q)}$ corresponding to a time unit whose identifier is q, where the matrix $W_2^{(q)}$ is a matrix of $N_t$ rows and N' columns, and q is a positive integer greater than m−$n_1$ and m−$n_1$−$n_2$; determining, by the first communications apparatus based on $W_2^{(q)}$, a second CQI in the time unit whose identifier is q; and sending, by the first communications apparatus, second CSI to the second communications apparatus, where the second CSI includes the second CQI.

In one embodiment, the method further includes: receiving, by the first communications apparatus, configuration information from the second communications apparatus, where the configuration information is used to indicate that the second CSI depends on the first CSI; and the determining, by the first communications apparatus based on the second PMI and the third PMI, a matrix $W_2^{(q)}$ corresponding to a time unit whose identifier is q includes: determining, by the first communications apparatus, $W_2^{(q)}$ based on the configuration information, the second PMI, and the third PMI.

Specifically, the second communications apparatus may send the configuration information to the first communications apparatus, to indicate that the second CSI depends on the first CSI. In this way, the first communications apparatus may calculate $W_2^{(q)}$ based on the second PMI and the third PMI that are included in the first CSI, thereby calculating the second CQI. In a possible implementation, the configuration information may be a CSI reporting index.

In one embodiment, before the receiving, by a first communications apparatus, reference signals from a second communications apparatus, the method further includes: receiving, by the first communications apparatus, first indication information from the second communications apparatus, where the first indication information is used to indicate transmission of at least two reference signals; and the receiving, by a first communications apparatus, reference signals from a second communications apparatus includes: receiving, by the first communications apparatus, a first reference signal and a second reference signal from the second communications apparatus based on the first indication information, where the first reference signal is used to measure the channel state in the first reference time unit, and the second reference signal is used to measure the channel state in the second reference time unit.

In this embodiment of this application, one piece of trigger signaling of the second communications apparatus may trigger transmission of at least two reference signals. Specifically, the second communications apparatus may send the first indication information to the first communications apparatus, to indicate the transmission of the at least two reference signals. The second communications apparatus sends the first reference signal and the second reference signal to the first communications apparatus. The first communications apparatus measures the channel state in the first reference time unit by using the first reference signal, measures the channel state in the second reference time unit by using the second reference signal, and reports the first CSI to the second communications apparatus in combination with the channel state in the first reference time unit and the channel state in the second reference time unit, where the CSI does not include a CSI-RS resource indicator (CRI).

In one embodiment, the method further includes: sending, by the first communications apparatus, second indication information to the second communications apparatus, where the second indication information is used to indicate whether the first CSI is available.

Specifically, the first communications apparatus may further send second indication information to the second communications apparatus, to indicate whether the first CSI is available. When receiving the second indication information used to indicate that the first CSI is unavailable, the second communications apparatus may determine that the first communications apparatus no longer calculates the second CSI based on the first CSI, or the second communications apparatus no longer performs channel prediction based on the first CSI. Further, the first communications apparatus may specifically indicate, in the second indication information, a moment after which the first CSI is unavailable. This is not limited in this embodiment of this application.

In one embodiment, for a periodic CSI reporting mode, the first CSI is sent by the first communications apparatus at a reporting moment in a first reporting periodicity, and the second CSI is sent by the first communications apparatus at a reporting moment in a second reporting periodicity, where the first reporting periodicity is greater than the second reporting periodicity.

Specifically, CSI reporting is classified into two reporting modes: periodic CSI reporting and aperiodic CSI reporting. In this embodiment of this application, two types of CSI are reported. A first type of CSI includes an RI, the first PMI, the second PMI, the third PMI, and a CQI. A second type of CSI includes a CQI or includes a CQI and an RI, and does not include the first PMI, the second PMI, or the third PMI. In the periodic CSI reporting mode, the first type of CSI may correspond to a longer reporting periodicity (that is, the first reporting period), and the second type of CSI may correspond to a shorter reporting periodicity (that is, the second reporting period).

It should be understood that, because the CQI in the second type of CSI is calculated based on the second PMI and the third PMI in the first type of CSI, it may be agreed on in a protocol that information reported at a reporting periodicity point of the first type of CSI that is closest to a current second type of CSI before a reporting periodicity point of the current second type of CSI is used as a reference to calculate a second type of CSI that needs to be reported currently. However, this is not limited in this embodiment of this application.

In one embodiment, a value of $n_1$ is agreed on in a protocol or configured by the second communications apparatus for the first communications apparatus by using signaling; and/or a value of $n_2$ is agreed on in a protocol or configured by the second communications apparatus for the first communications apparatus by using signaling.

According to a second aspect, another CSI reporting method is provided, and includes: sending, by a second communications apparatus, reference signals to a first communications apparatus; and receiving, by the second communications apparatus, first CSI sent by the first communications apparatus based on the reference signals in a time unit whose identifier is m, where the first CSI is used to indicate a channel state in a first reference time unit and a channel state in a second reference time unit, where an identifier of the first reference time unit is $m-n_1$, an identifier of the second reference time unit is $m-n_1-n_2$, m, $n_1$, and $n_2$ are integers, and $n_2$ is not equal to 0.

According to the CSI reporting method in this embodiment of this application, the first communications apparatus may feed back channel states in at least two time units to the second communications apparatus in one CSI feedback, so that the second communications apparatus estimates CSI to be applied. This helps improve a matching degree between the CSI applied by the second communications apparatus and a channel that is at a current moment, thereby improving data transmission performance.

In one embodiment, the first CSI includes a first precoding matrix indicator PMI, a second PMI, and a third PMI, where the first PMI is used to indicate a matrix $W_1$ corresponding to the first reference time unit and the second reference time unit, the second PMI is used to indicate a matrix $W_2^{(1)}$ corresponding to the first reference time unit, the third PMI is used to indicate a matrix $W_2^{(2)}$ corresponding to the second reference time unit, a precoding matrix corresponding to the first reference time unit satisfies $W^{(1)}=W_1 \times W_2^{(1)}$, and a precoding matrix corresponding to the second reference time unit satisfies $W^{(2)}=W_1 \times W_2^{(2)}$.

In one embodiment, the third PMI is used to indicate a relative phase value $\Delta c_n$ and the relative phase value $\Delta c_n$ is specifically used to represent a relative value between $c_n^{(2)}$ in an $n^{th}$ column in $W_2^{(2)}$ and a coefficient $c_n^{(1)}$ at a corresponding location in $W_2^{(1)}$, where $n \in \{1, 2, L, N-1\}$, and N is a positive integer.

In one embodiment, if $$c_n^{(1)} = e^{j\varphi_n^{(1)}} \text{ and } c_n^{(2)} = e^{j\varphi_n^{(2)}},$$

$\Delta c_n = \varphi_n^{(1)} - \varphi_n^{(2)}$, or $\Delta c_n = \varphi_n^{(2)} - \varphi_n^{(1)}$, where $\varphi_n^{(1)}$ represents a phase of the complex number $c_n^{(1)}$, and $\varphi_n^{(2)}$ represents a phase of the complex number $c_n^{(2)}$.

In one embodiment, the third PMI is used to indicate a relative amplitude value $\Delta p_{x,y,z}$, and the relative amplitude value $\Delta p_{x,y,z}$ is specifically used to represent a relative value between an amplitude coefficient $\Delta p_{x,y,z}^{(2)}$ in an $(x \times l+z)^{th}$ row and a $y^{th}$ column in $W_2^{(2)}$ and an amplitude coefficient $p_{x,y,z}^{(1)}$ at a corresponding location in $W_2^{(1)}$; and/or the third PMI is used to indicate a relative phase value $\Delta c_{x,y,z}$, and the relative phase value $\Delta c_{x,y,z}$ is specifically used to represent a relative value between a phase coefficient $\Delta c_{x,y,z}^{(2)}$ in the $(x \times l+z)^{th}$ row and the $y^{th}$ column in $W_2^{(2)}$ and a phase coefficient $\Delta c_{x,y,z}^{(1)}$ at a corresponding location in $W_2^{(1)}$, where the matrices $W_2^{(1)}$ and $W_2^{(2)}$ each are a matrix of 2l rows and N columns, both 1 and N are positive integers, x and z represent row numbers of $W_2^{(1)}$ and $W_2^{(2)}$, y represents column numbers of $W_2^{(1)}$ and $W_2^{(2)}$, $x \in \{0,1\}$, $z \in \{1,2,L,l\}$, and $y \in \{1,2,L,N\}$.

In one embodiment, $\Delta p_{x,y,z} = p_{x,y,z}^{(1)}/p_{r\ x,y,z}^{(2)}$, or $\Delta p_{x,y,z} = p_{x,y,z}^{(2)}/p_{x,y,z}^{(1)}$.

In one embodiment, if $$c_{x,y,z}^{(1)} = e^{j\varphi_{x,y,z}^{(1)}}, \text{ and } c_{x,y,z}^{(2)} = e^{j\varphi_{x,y,z}^{(2)}},$$

$\Delta c_{x,y,z} = \varphi_{x,y,z}^{(1)} - \varphi_{x,y,z}^{(2)}$, or $\Delta c_{x,y,z} = \varphi_{x,y,z}^{(2)} - \varphi_{x,y,z}^{(1)}$, where $j^2 = -1$, $\varphi_{x,y,z}^{(1)}$ represents a phase of the complex number $c_{x,y,z}^{(1)}$, and $\varphi_{x,y,z}^{(2)}$ represents a phase of the complex number $c_{x,y,z}^{(2)}$.

In one embodiment, the first CSI includes a first PMI, a second PMI, a third PMI, and a sixth PMI, where the first PMI is used to indicate a matrix $w_1$ corresponding to the first reference time unit and the second reference time unit, the sixth PMI is used to indicate a matrix $W_3$ corresponding to the first reference time unit and the second reference time unit, the second PMI is used to indicate a matrix $w_2^{(1)'}$ corresponding to the first reference time unit, the third PMI is used to indicate a matrix $w_2^{(2)'}$ corresponding to the second reference time unit, a precoding matrix corresponding to the first reference time unit satisfies $w^{(1)'} = w_1 \times w_2^{(1)'} \times w_3$, and a precoding matrix corresponding to the second reference time unit satisfies $w^{(2)'} = w_1 \times w_2^{(2)'} \times w_3$.

In one embodiment, the third PMI is used to indicate a relative amplitude value $\Delta p_{x,y,z}$, and the relative amplitude value $\Delta p_{x,y,z}$ is specifically used to represent a relative value between an amplitude coefficient $p_{x,y,z}^{(2)}$ in an $(x \times l+z)^{th}$ row and a $y^{th}$ column in $w_2^{(2)'}$ and an amplitude coefficient $p_{x,y,z}^{(1)}$ at a corresponding location in $w_2^{(1)'}$; and/or the third PMI is used to indicate a relative phase value $\Delta c_{x,y,z}$, and the relative phase value $\Delta c_{x,y,z}$ is specifically used to represent a relative value between a phase coefficient $c_{x,y,z}^{(2)}$ in the $(x \times l+z)^{th}$ row and the $y^{th}$ column in $w_2^{(2)'}$ and a phase coefficient $c_{x,y,z}^{(1)}$ at a corresponding location in $w_2^{(1)'}$, where the matrices $w_2^{(1)'}$ and $w_2^{(2)'}$ each are a matrix of 2l rows and N" columns, 1 and N" are both positive integers, x and z represent row numbers of $w_2^{(1)'}$ and $w_2^{(2)'}$, y represents column numbers of $w_2^{(1)'}$ and $w_2^{(2)'}$, $x \in \{0,1\}$, $z \in \{1,2,L,l\}$ and $y \in \{1,2,L,N"\}$.

In one embodiment, the third PMI is used to indicate a relative amplitude value $\Delta p_{x,y}$, and the relative amplitude value $\Delta p_{x,y}$ is specifically used to represent a relative value between an amplitude coefficient $p_{x,y}^{(2)}$ in an $(x+1)^{th}$ row and a $(y+1)^{th}$ column in $w_2^{(2)'}$ and an amplitude coefficient $\Delta p_{x,y}^{(1)}$ at a corresponding location in $w_2^{(1)'}$; and/or the third PMI is used to indicate a relative phase value $\Delta c_{x,y}$, and the relative phase value $\Delta c_{x,y}$ is specifically used to represent a relative value between a phase coefficient $c_{x,y}^{(2)}$ in the $(x+1)^{th}$ row and the $(y+1)^{th}$ column in $w_2^{(2)'}$ and a phase coefficient $c_{x,y}^{(1)}$ at a corresponding location in $w_2^{(1)'}$, where the matrices $w_2^{(1)'}$ and $w_2^{(2)'}$ each are a matrix of 2l rows and N" columns, 1 and N" are both positive integers, x represents row numbers of $w_2^{(1)'}$ and $w_2^{(2)'}$, y represents column numbers of $w_2^{(1)'}$ and $w_2^{(2)'}$, $x \in \{0,1,L,2l-1\}$, and $y \in \{0,1,L,N"-1\}$.

In one embodiment, the method further includes: receiving, by the second communications apparatus, second CSI from the first communications apparatus, where the second CSI includes a second CQI, the second CQI is determined based on a matrix $W_2^{(q)}$ or $w_2^{(q)'}$ that corresponds to a time unit whose identifier is q, a precoding matrix corresponding to the time unit whose identifier is q satisfies $W^{(q)} = W_1 \times W_2^{(q)}$ or $w^{(q)'} = w_1 \times w_2^{(q)'} \times w_3$, the matrix $W_2^{(q)}$ is a matrix of 2l rows and N' columns, the matrix $w_2^{(q)'}$ is a matrix of 2l rows and N" columns, q is a positive integer greater than m−n$_1$ and m−n$_1$−n$_2$, and N' and N" are positive integers.

In one embodiment, $W_2^{(q)}$ is determined based on the second PMI, the third PMI, and an amplitude coefficient $p_{x,y',z}^{(q)}$ in an $(x \times l+z)^{th}$ row and a $y'^{th}$ column n $W_2^{(q)}$ and/or a phase coefficient $c_{x,y',z}^{(q)}$ in the $(x \times l+z)^{th}$ row and the $y'^{th}$ column in $W_2^{(q)}$, where $p_{x,y',z}^{(q)}$ and $c_{x,y',z}^{(q)}$ are calculated by using the following formulas:

$$p_{x,y',z}^{(q)} = p_{x,y',z}^{(1)} \times (\Delta p_{x,y',z})^Y, \text{ and}$$

$$c_{x,y',z}^{(q)} = e^{j\left(\varphi_{x,y',z}^{(1)} + Y \times \Delta c_{x,y',z}\right)},$$

where

Y represents a ratio of a difference between the identifier q and the identifier of the first reference time unit to a difference between the identifier of the first reference time unit and the identifier of the second reference time unit $y' \in \{1,2,L\ N'\}$, and $N' \leq N$.

In one embodiment, $\Delta p_{x,y,z} = p_{x,y,z}^{(1)} - p_{x,y,z}^{(2)}$, or $\Delta p_{x,y,z} = p_{x,y,z}^{(2)} - p_{x,y,z}^{(1)}$.

In one embodiment, $\Delta c_{x,y,z} = c_{x,y,z}^{(1)} - c_{x,y,z}^{(2)}$, or $\Delta c_{x,y,z} = c_{x,y,z}^{(2)} - c_{x,y,z}^{(1)}$.

In one embodiment, $W_2^{(q)}$ is determined based on the second PMI, the third PMI, and an amplitude coefficient $p_{x,y',z}^{(q)}$ in the $(x \times l+z)^{th}$ row and the $y'^{th}$ column in $W_2^{(q)}$ and/or a phase coefficient $c_{x,y',z}^{(q)}$ in the $(x \times l+z)^{th}$ row and the $y'^{th}$ column in $W_2^{(q)}$, where $p_{x,y',z}^{(q)}$ and $c_{x,y',z}^{(q)}$ are calculated by using the following formulas:

$$p_{x,y',z}^{(q)} = p_{x,y',z}^{(1)} + Y \times \Delta p_{x,y',z}, \text{ and}$$

$$c_{x,y',z}^{(q)} = c_{x,y',z}^{(1)} + Y \times \Delta c_{x,y',z}, \text{ where}$$

Y represents a ratio of a difference between the identifier q and the identifier of the first reference time unit to a difference between the identifier of the first reference time unit and the identifier of the second reference time unit $y' \in \{1,2,L\ N'\}$, and $N' \leq N$.

In one embodiment, $W_2^{(q)}$ is determined based on the second PMI, the third PMI, and an amplitude coefficient $p_{x,y',z}^{(q)}$ in the $(x \times l+z)^{th}$ row and the $y'^{th}$ column in $W_2^{(q)}$ and/or a phase coefficient $c_{x,y',z}^{(q)}$ in the $(x \times l+z)^{th}$ row and the $y'^{th}$ column in $W_2^{(q)}$, where $p_{x,y',z}^{(q)}$ and $c_{x,y',z}^{(q)}$ are calculated by using the following formulas:

$$p_{x,y',z}^{(q)} = p_{x,y',z}^{(1)} + Y \times \Delta p_{x,y',z}, \text{ and } c_{x,y',z}^{(q)} = e^{j\left(\varphi_{x,y',z}^{(1)} + Y \times \Delta c_{x,y',z}\right)},$$

where

Y represents a ratio of a difference between the identifier q and the identifier of the first reference time unit to a difference between the identifier of the first reference time unit and the identifier of the second reference time unit y'∈{1,2,L N'}, and N'≤N.

In one embodiment, $W_2^{(q)}$ is determined based on the second PMI, the third PMI, and an amplitude coefficient $p_{x,y'z}^{(q)}$ in the $(x\times l+z)^{th}$ row and the $y'^{th}$ column in $W_2^{(q)}$ and/or a phase coefficient $c_{x,y'z}^{(q)}$ in the $(x\times l+z)^{th}$ row and the $y'^{th}$ column in $W_2^{(q)}$, where $p_{x,y'z}^{(q)}$ and $c_{x,y'z}^{(q)}$ are calculated by using the following formulas:

$$p_{x,y'z}^{(q)}=p_{x,y'z}^{(1)}\times(\Delta p_{x,y'z})^Y, \text{ and}$$

$$c_{x,y'z}^{(q)}=c_{x,y'z}^{(1)}+Y\times\Delta c_{x,y'z}, \text{ where}$$

Y represents a ratio of a difference between the identifier q and the identifier of the first reference time unit to a difference between the identifier of the first reference time unit and the identifier of the second reference time unit y'∈{1,2,L N'}, and N'≤N.

In one embodiment, the first CSI includes a fourth PMI and a fifth PMI, where the fourth PMI is used to indicate the precoding matrix $w^{(1)}$ corresponding to the first reference time unit, and the fifth PMI is used to indicate the precoding matrix $w^{(2)}$ corresponding to the second reference time unit.

In one embodiment, the fifth PMI is used to indicate a relative coefficient value $\Delta w_{r,t}$, and the relative coefficient value $\Delta w_{r,t}$ is specifically used to represent a relative value between a coefficient $w_{r,t}^{(2)}$ in an $r^{th}$ row and a $t^{th}$ column in $w^{(2)}$ and a coefficient $w_{r,t}^{(1)}$ at a corresponding location in $w^{(1)}$, where the matrices $w^{(1)}$ and $w^{(2)}$ each are a matrix of $N_t$ rows and N columns, both $N_t$ and N are positive integers, r represents row numbers of $w^{(1)}$ and $w^{(2)}$, t represents column numbers of $w^{(1)}$ and $w^{(2)}$, r∈{1,2,L,N}, and t∈{1,2,L,N}.

In one embodiment, the method further includes: sending, by the second communications apparatus, configuration information to the first communications apparatus, where the configuration information is used to indicate that the second CSI depends on the first CSI.

In one embodiment, before the sending, by a second communications apparatus, reference signals to a first communications apparatus, the method further includes: sending, by the second communications apparatus, first indication information to the first communications apparatus, where the first indication information is used to indicate transmission of at least two reference signals; and the sending, by a second communications apparatus, reference signals to a first communications apparatus includes: sending, by the second communications apparatus, a first reference signal and a second reference signal to the first communications apparatus, where the first reference signal is used to measure the channel state in the first reference time unit, and the second reference signal is used to measure the channel state in the second reference time unit.

In one embodiment, the method further includes: receiving, by the second communications apparatus, second indication information from the first communications apparatus, where the second indication information is used to indicate whether the first CSI is available.

In one embodiment, for a periodic CSI reporting mode, the first CSI is sent by the first communications apparatus at a reporting moment in a first reporting periodicity, and the second CSI is sent by the first communications apparatus at a reporting moment in a second reporting periodicity, where the first reporting periodicity is greater than the second reporting periodicity.

In one embodiment, a value of $n_1$ is agreed on in a protocol or configured by the second communications apparatus for the first communications apparatus by using signaling; and/or a value of $n_2$ is agreed on in a protocol or configured by the second communications apparatus for the first communications apparatus by using signaling.

According to a third aspect, another CSI reporting method is provided, and includes: receiving, by a first communications apparatus, reference signals from a second communications apparatus; and performing, by the first communications apparatus, channel measurement based on the reference signals, and sending third CSI to the second communications apparatus in a time unit whose identifier is K, where the third CSI is used to indicate a channel state in a third reference time unit, where an identifier of the third reference time unit is K+$n_3$, K is an integer, and $n_3$ is a positive integer.

According to the CSI reporting method in this embodiment of this application, the first communications apparatus may feed back the third CSI to the second communications apparatus in the time unit whose identifier is K, where the third CSI indicates the channel state in the third reference time unit whose identifier is K+$n_3$, so that the second communications apparatus directly obtains a latest channel state. This helps improve a matching degree between CSI applied by the second communications apparatus and a channel that is at a current moment, thereby improving data transmission performance.

In one embodiment, the third CSI includes a seventh PMI and an eighth PMI, where the seventh PMI is used to indicate a matrix $w_1$ corresponding to the third reference time unit, the eighth PMI is used to indicate a matrix $W_2^{(3)}$ corresponding to the third reference time unit, and a precoding matrix corresponding to the third reference time unit satisfies $W^{(3)}=W_1\times W_2^{(3)}$.

In one embodiment, the third CSI includes a seventh PMI, an eighth PMI, and a ninth PMI, where the seventh PMI is used to indicate a matrix $w_1$ corresponding to the third reference time unit, the ninth PMI is used to indicate a matrix $W_3$ corresponding to the third reference time unit, the eighth PMI is used to indicate a matrix $w_2^{(3)'}$ corresponding to the third reference time unit, and a precoding matrix corresponding to the third reference time unit satisfies $w^{(3)'}=w_1\times w_2^{(3)'}\times w_3$.

In one embodiment, before the receiving, by a first communications apparatus, reference signals from a second communications apparatus, the method further includes: receiving, by the first communications apparatus, third indication information from the second communications apparatus, where the third indication information is used to indicate transmission of at least two reference signals; the receiving, by a first communications apparatus, reference signals from a second communications apparatus includes: receiving, by the first communications apparatus, a third reference signal and a fourth reference signal from the second communications apparatus based on the third indication information; and the method further includes: determining, by the first communications apparatus, the third CSI based on the third reference signal and the fourth reference signal.

In one embodiment, the first communications apparatus receives fourth indication information, where the fourth indication information is used to indicate time domain positions of the at least two reference signals, and time domain positions of all of the at least two reference signals are different.

Specifically, the second communications apparatus may send the fourth indication information to the first communications apparatus, to indicate the time domain positions (for example, CSI-RS resources) of the at least two reference signals. In this embodiment of this application, when the time domain locations of the at least two reference signals are configured, the third CSI reported by the first communications apparatus may include an RI, a PMI, and a CQI, but does not include a reference signal resource indicator (CSI-RS resource indicator, CRI).

According to a fourth aspect, a CSI reporting apparatus is provided, and is configured to perform the method according to the first aspect or embodiments of the first aspect. Specifically, the apparatus includes units configured to perform the method according to the first aspect or embodiments of the first aspect.

According to a fifth aspect, another CSI reporting apparatus is provided, and is configured to perform the method according to the second aspect or embodiments of the second aspect. Specifically, the apparatus includes units configured to perform the method according to the second aspect or embodiments of the second aspect.

According to a sixth aspect, another CSI reporting apparatus is provided, and is configured to perform the method according to the third aspect or embodiments of the third aspect. Specifically, the apparatus includes units configured to perform the method according to the third aspect or embodiments of the third aspect.

According to a seventh aspect, another CSI reporting apparatus is provided. The apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal, and control a transmitter to send a signal. In addition, when the processor executes the instruction stored in the memory, the processor is enabled to perform the method according to any one of the first aspect or embodiments of the first aspect.

According to an eighth aspect, another CSI reporting apparatus is provided. The apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal, and control a transmitter to send a signal. In addition, when the processor executes the instruction stored in the memory, the processor is enabled to perform the method according to any one of the second aspect or embodiments of the second aspect.

According to a ninth aspect, another CSI reporting apparatus is provided. The apparatus includes a transceiver, a memory, and a processor. The transceiver, the memory, and the processor communicate with each other by using an internal connection path. The memory is configured to store an instruction. The processor is configured to execute the instruction stored in the memory, to control a receiver to receive a signal, and control a transmitter to send a signal. In addition, when the processor executes the instruction stored in the memory, the processor is enabled to perform the method according to any one of the third aspect or embodiments of the third aspect.

According to a tenth aspect, a computer program product is provided. The computer program product includes computer program code. When the computer program code is run by a computer, the computer is enabled to perform the methods in the foregoing aspects.

According to an eleventh aspect, a computer-readable medium is provided, and is configured to store a computer program, where the computer program includes an instruction used to perform the methods in the foregoing aspects.

According to a twelfth aspect, a chip system is provided, and includes: an input interface, an output interface, at least one processor, and a memory. The input interface, the output interface, the processor, and the memory are connected to each other by using an internal connection path. The processor is configured to execute code in the memory. When the code is executed, the processor is configured to perform the methods in the foregoing aspects.

DESCRIPTION OF EMBODIMENTS

Figure 1:
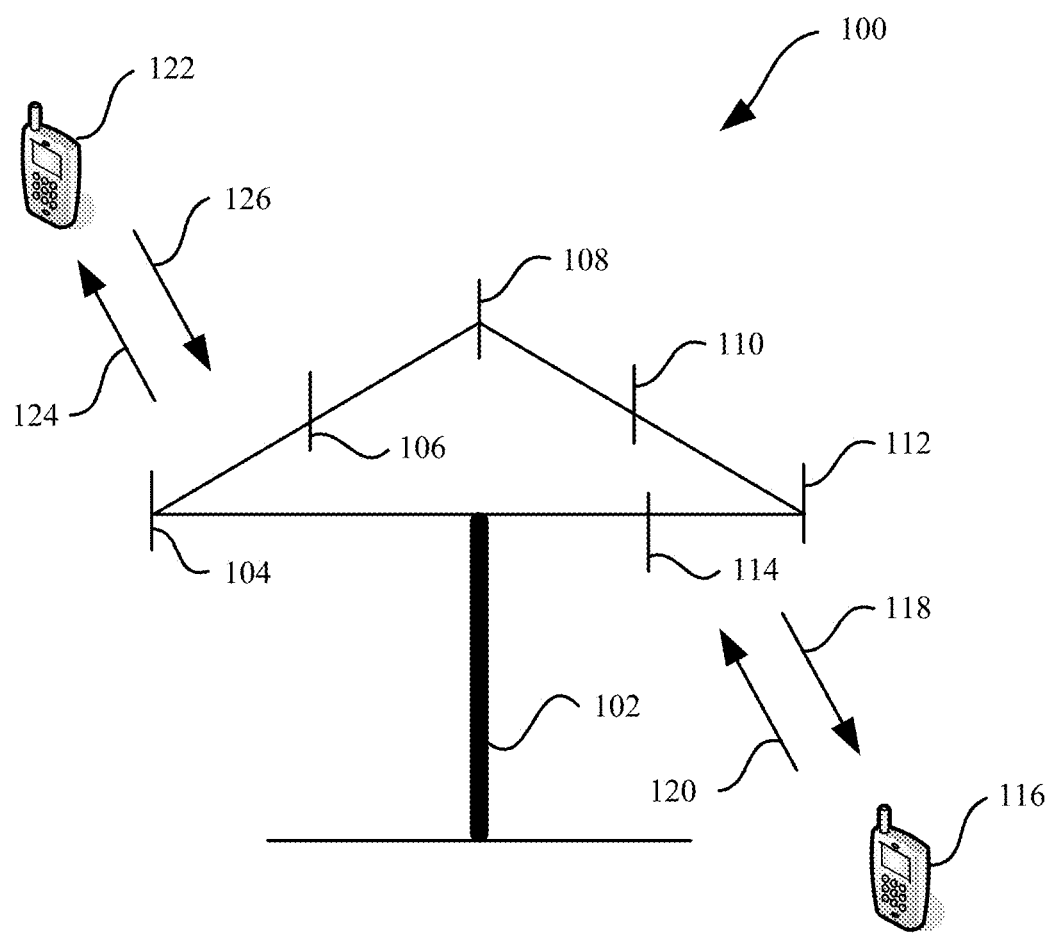
FIG. 1 is a schematic diagram of a communications system according to an embodiment of this application.

The following describes technical solutions in this application with reference to accompanying drawings.

It should be understood that, the technical solutions in embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future fifth-generation (5G) system, or a new radio (NR) system.

It should be further understood that, the technical solutions in the embodiments of this application may alternatively be applied to various communications systems based on a non-orthogonal multiple access technology, for example, a sparse code multiple access (SCMA) system. Certainly, SCMA may also be referred to as another name in the communications field. Further, the technical solutions in the embodiments of this application may be applied to a multi-carrier transmission system for which the non-orthogonal multiple access technology is used, for example, an orthogonal frequency division multiplexing (OFDM) system, a filter-bank multi-carrier (FBMC) system, a generalized frequency division multiplexing (GFDM) system, or a filtered orthogonal frequency division multiplexing (F-OFDM) system for which the non-orthogonal multiple access technology is used.

It should be further understood that, a terminal device in the embodiments of this application may communicate with one or more core networks by using a radio access network (RAN), and the terminal device may be referred to as an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like.

It should be further understood that, in the embodiments of this application, a network device may be configured to communicate with a terminal device. The network device may be a base transceiver station (BTS) in a GSM system or a CDMA system, or may be a NodeB (NB) in a WCDMA system, or may be an evolved NodeB (eNB or eNodeB) in an LTE system. Alternatively, the network device may be a relay station, an access point, a vehicle-mounted device, a wearable device, a network side device in a future 5G network, a network device in a future evolved PLMN network, or the like.

The embodiments of this application may be applicable to an LTE system and a subsequent evolved system such as 5G, or other wireless communications systems for which various radio access technologies are used, for example, systems for which access technologies such as code division multiple access, frequency division multiple access, time division multiple access, orthogonal frequency division multiple access, and single carrier frequency division multiple access are used, and particularly applicable to a scenario in which channel information needs to be fed back and/or a two-stage precoding technology is used, for example, a wireless network for which a massive MIMO technology is used or a wireless network for which a distributed antenna technology is used.

It should be understood that, a multiple-input multiple-output (MIMO) technology means that a plurality of transmit antennas and receive antennas are respectively used at a transmit end device and a receive end device, to transmit and receive signals by using the plurality of antennas of the transmit end device and the receive end device, to improve communication quality. In the technology, spatial resources can be fully used, and multiple-output multiple-input is implemented by using the plurality of antennas, so that a system channel capacity can be increased exponentially without increasing a spectrum resource and an antenna transmit power.

MIMO may be classified into single-user multiple-input multiple-output (SU-MIMO) and multi-user multiple-input multiple-output (MU-MIMO). In massive MIMO, based on a multi-user beamforming principle, several hundreds of antennas are arranged at a transmit end device, to modulate respective beams for dozens of target receivers, and transmit dozens of signals simultaneously on a same frequency resource through spatial signal isolation. Therefore, in the massive MIMO technology, spatial freedom brought by configuring large-scale antennas can be fully used, to improve spectral efficiency.

FIG. 1 is a schematic diagram of a communications system used in an embodiment of this application. As shown in FIG. 1, the communications system 100 includes a network device 102, and the network device 102 may include a plurality of antenna groups. Each antenna group may include one or more antennas. For example, one antenna group may include antennas 104 and 106, another antenna group may include antennas 108 and 110, and an additional group may include antennas 112 and 114. Two antennas are shown for each antenna group in FIG. 1. However, more or fewer antennas may be used for each group. The network device 102 may additionally include a transmitter chain and a receiver chain. A person of ordinary skill in the art may understand that the transmitter chain and the receiver chain may both include a plurality of components related to signal sending and receiving, for example, a processor, a modulator, a multiplexer, a demodulator, a demultiplexer, or an antenna.

The network device 102 may communicate with a plurality of terminal devices. For example, the network device 102 may communicate with a terminal device 116 and a terminal device 122. However, it may be understood that, the network device 102 may communicate with any quantity of terminal devices that are similar to the terminal device 116 or 122. The terminal devices 116 and 122 may each be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the terminal device 116 communicates with the antennas 112 and 114. The antennas 112 and 114 send information to the terminal device 116 over a forward link 118, and receive information from the terminal device 116 over a reverse link 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex FDD system, the forward link 118 may use a frequency band different from that used by the reverse link 120, and the forward link 124 may use a frequency band different from that used by the reverse link 126.

For another example, in a time division duplex TDD system and a full duplex system, the forward link 118 and the reverse link 120 may use a common frequency band, and the forward link 124 and the reverse link 126 may use a common frequency band.

Each group of antennas and/or each area designed for communication is referred to as a sector of the network device 102. For example, an antenna group may be designed to communicate with a terminal device in a sector within a coverage area of the network device 102. In a process in which the network device 102 communicates with the terminal devices 116 and 122 respectively by using the forward links 118 and 124, a transmit antenna of the network device 102 can improve signal-to-noise ratios of the forward links 118 and 124 through beamforming. In addition, compared with a manner in which the network device sends, by using a single antenna, a signal to all terminal devices served by the network device, when the network device 102 sends, through beamforming, a signal to the terminal devices 116 and 122 that are randomly scattered within a related coverage area, less interference is caused to a mobile device in a neighboring cell.

At a given time, the network device 102 and the terminal device 116 or the terminal device 122 each may be a wireless communications sending apparatus and/or a wireless communications receiving apparatus. When sending data, the wireless communications sending apparatus may code the data, for transmission. Specifically, the wireless communications sending apparatus may obtain a specific quantity of data bits to be sent to the wireless communications receiving apparatus through a channel. For example, the wireless communications sending apparatus may generate, receive from another communications apparatus, or store in a memory, the specific quantity of data bits to be sent to the wireless communications receiving apparatus through the channel. The data bits may be included in a transport block or a plurality of transport blocks of the data, and the transport block may be segmented to generate a plurality of code blocks.

In addition, the communications system 100 may be a public land mobile network PLMN network, a device-to-device (D2D) network, a machine-to-machine (M2M) network, or another network. FIG. 1 is merely an example of a simplified schematic diagram for ease of understanding, and the network may further include another network device that is not shown in FIG. 1.

For ease of understanding, the following first describes related terms in the embodiments of this application.

A time unit may be a subframe (or frame), a slot, or a symbol. An identifier of the time unit may be specifically an identifier of the subframe, the slot, or the symbol. The identifier of the symbol is used as an example. In one resource unit (including one or more resource blocks (RB)), identifiers of symbols may be 0 to 6 (or 1 to 7), or may be 0 to 13 (or 1 to 14).

Generally, identifiers of time units are cyclic. For example, in each resource unit, identifiers of symbols are 0 to 13. For a plurality of resource units, identifiers of symbols are sequentially 0 to 13, 0 to 13, . . . , 0 to 13, and the like. If an identifier of a time unit is a negative value, the time unit is a time unit corresponding to the value during forward recursion from a resource unit corresponding to a current moment. For example, based on the foregoing definition, an identifier of a time unit may be −2. If a resource unit corresponding to a current moment is the second resource unit in resource units corresponding to identifiers of symbols, that is, 0 to 13, 0 to 13, . . . , and 0 to 13, during forward recursion, a time unit whose identifier is −2 represents a time unit that is in the first resource unit and whose identifier is 12.

Figure 2:
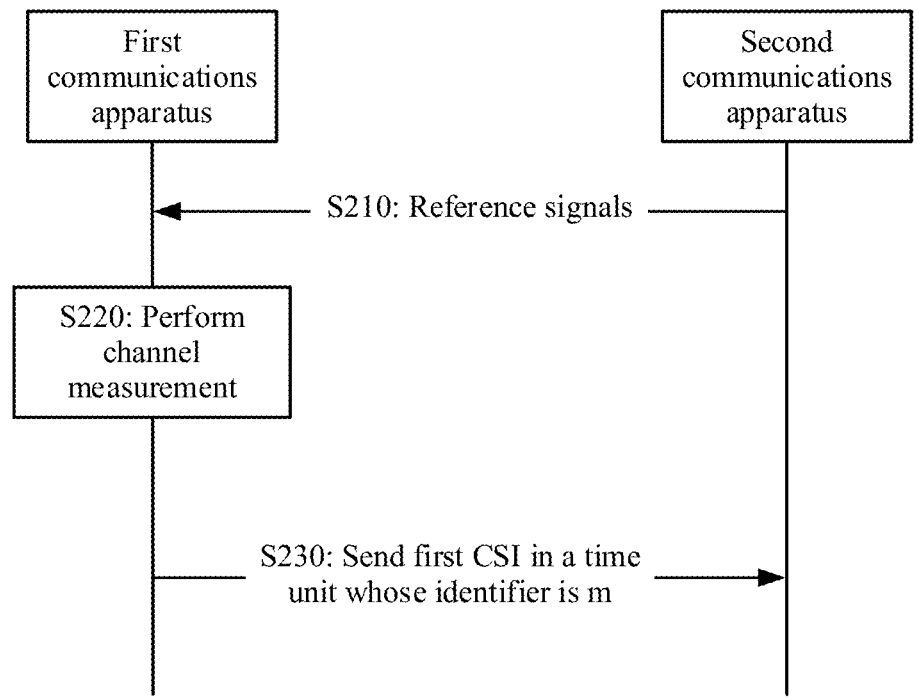
FIG. 2 is a schematic flowchart of a CSI reporting method according to an embodiment of this application.

FIG. 2 is a schematic flowchart of a CSI reporting method 200 according to an embodiment of this application. The method 200 may be applied to the communications system 100 shown in FIG. 1. However, this embodiment of this application is not limited thereto.

Operation S210: A second communications apparatus sends reference signals to a first communications apparatus, and correspondingly, the first communications apparatus receives the reference signals from the second communications apparatus.

Operation S220: The first communications apparatus performs channel measurement based on the reference signals.

Operation S230: The first communications apparatus sends first channel state information CSI to the second communications apparatus in a time unit whose identifier is m, where the first CSI is used to indicate a channel state in a first reference time unit and a channel state in a second reference time unit, and correspondingly, the second communications apparatus receives the first CSI sent by the first communications apparatus, where an identifier of the first reference time unit is $m-n_1$, an identifier of the second reference time unit is $m-n_1-n_2$, m, $n_1$, and $n_2$ are integers, and $n_2$ is not equal to 0.

Specifically, to obtain the channel state information CSI, the second communications apparatus may send the reference signals to the first communications apparatus. The first communications apparatus receives the reference signals, performs channel measurement, and feeds back the obtained first CSI to the second communications apparatus. In this embodiment of this application, the first communications apparatus feeds back the first CSI to the second communications apparatus in the time unit whose identifier is m, and the first CSI is used to indicate the channel state of the first reference time unit whose identifier is $m-n_1$ and the channel state of the second reference time unit whose identifier is $m-n_1-n_2$.

Further, the second communications apparatus obtains the first CSI. When a channel changes, the second communications apparatus may predict a channel state at another moment based on information carried in the first CSI. However, this is not limited in this embodiment of this application.

It should be understood that, the CSI fed back by the first communications apparatus is relatively sensitive to a delay. Particularly for the first communications apparatus at a relatively high moving speed, because the CSI reflects a channel state at a measurement moment, if moving of the first communications apparatus causes a change of the channel, the CSI received by the second communications apparatus cannot completely reflect a channel state at a current moment. In this case, if the second communications apparatus directly applies the CSI fed back by the first communications apparatus, a matching degree between the CSI and a channel that is at the current moment is caused to decrease, and data transmission performance is affected.

However, in the CSI reporting method in this embodiment of this application, the first communications apparatus may feed back channel states in at least two time units to the second communications apparatus in one CSI feedback, so that the second communications apparatus estimates CSI to be applied. This helps improve a matching degree between the CSI applied by the second communications apparatus and the channel that is at the current moment, thereby improving data transmission performance.

In one embodiment, both $n_1$ and $n_2$ are less than 0. That is, both the first reference time unit and the second reference time unit are time units after the time unit whose identifier is m. The first communications apparatus may predict channel state information in the first reference time unit and the second reference time unit, and directly sends a prediction result, namely, the first CSI, to the second communications apparatus in the time unit whose identifier is m. After obtaining the first CSI, the second communications apparatus may determine the channel state information in the first reference time unit and the second reference time unit, and does not need to further estimate the channel state information. In addition, the second communications apparatus may further estimate channel state information at another moment based on the channel state in the first reference time unit and the channel state in the second reference time unit, to transmit data at the another moment. This improves a matching degree between CSI and a channel that is at a data transmission moment, and improves transmission performance.

In this embodiment of this application, because $n_2$ is not equal to 0, and $m-n_1$ is not equal to $m-n_1-n_2$, the first reference time unit is different from the second reference time unit. It should be understood that, in this embodiment of this application, m is an integer, and represents an identifier of a time unit at a current CSI reporting moment. $m-n_1$ and $m-n_1-n_2$ may be positive integers, or may be negative integers. This is not limited in this embodiment of this application.

In one embodiment, the reference time unit may be represented by using a reference resource. The reference resource may usually include a time domain resource and a frequency domain resource. The time domain resource is the reference time unit. However, this is not limited in this embodiment of this application.

It should be further understood that, the first communications apparatus may be a terminal device, or may be a chip system disposed inside a terminal device, and the second communications apparatus may be a network device, or may be a chip system disposed inside a network device. However, this is not limited in this embodiment of this application. The chip system may include an input interface, an output interface, at least one processor, and a memory. The input interface, the output interface, the processor, and the memory communicate with each other by using an internal connection path. The processor is configured to execute code in the memory.

In a specific implementation, the reference signal is a channel state information-reference signal (CSI-RS).

In the foregoing method 200, signaling may be directly transmitted between the first communications apparatus and the second communications apparatus, or may be indirectly transmitted between the first communications apparatus and the second communications apparatus, to be specific, be transmitted by using a relay device. Therefore, this embodiment of this application may be further applied to an application scenario in which there is a relay device or an application scenario for device-to-device (D2D) communication. This is not limited in this embodiment of this application.

When the first communications apparatus feeds back the first CSI, a single codebook structure or a double codebook structure, namely, a two-stage codebook, may be used for the first CSI. This is not limited in this embodiment of this application. It should be understood that, in this specification, a superscript (1) is used to indicate a parameter corresponding to the first reference time unit, and a superscript (2) is used to indicate a parameter corresponding to the second reference time unit. Other superscripts are similar, and are not listed one by one herein. The following first describes the double codebook structure.

In one embodiment, the first CSI includes a first precoding matrix indicator PMI, a second PMI, and a third PMI, where the first PMI is used to indicate a matrix $w_1$ corresponding to the first reference time unit and the second reference time unit, the second PMI is used to indicate a matrix $W_2^{(2)}$ corresponding to the first reference time unit, the third PMI is used to indicate a matrix $W_2^{(2)}$ corresponding to the second reference time unit, a precoding matrix corresponding to the first reference time unit satisfies $W^{(1)}=W_1 \times W_2^{(1)}$, and a precoding matrix corresponding to the second reference time unit satisfies $W^{(2)}=W_1 \times W_2^{(2)}$.

Specifically, in this specification, a precoding matrix indicator (PMI) is used to indicate, from a predefined codebook, a precoding matrix recommended by the first communications apparatus and used for data transmission, a PMI is used to indicate a channel matrix of the first communications apparatus, a PMI is used to indicate a channel matrix of one or some receive antenna ports of the first communications apparatus, a PMI is used to indicate a correlation matrix of a channel matrix of the first communications apparatus, or a PMI is used to indicate at least one eigenvector of a correlation matrix of a channel matrix of the first communications apparatus.

The first CSI may include the first PMI, the second PMI, and the third PMI. The first PMI is used to indicate the matrix $w_1$. $w_1$ is applicable to both the first reference time unit and the second reference time unit. The second PMI is used to indicate the matrix $W_2^{(1)}$ corresponding to the first reference time unit. The third PMI is used to indicate the matrix $W_2^{(2)}$ corresponding to the second reference time unit.

That the PMI indicates the precoding matrix is used as an example. When receiving the first CSI of the double codebook structure, the second communications apparatus may calculate the precoding matrix $w^{(1)}$ of the first reference time unit based on $w_1$ and $W_2^{(1)}$, and calculate the precoding matrix $w^{(2)}$ of the second reference time unit based on $w_1$ and $W_2^{(2)}$. Because $w_1$ is the same in entire communication bandwidth, the first communications apparatus may feed back CSI of the foregoing double codebook structure, to reduce feedback overheads.

That the PMI indicates at least one eigenvector of a spatial correlation matrix of the channel matrix is used as an example. When receiving the first CSI of the double codebook structure, the second communications apparatus may calculate, based on $w_1$ and $W_2^{(1)}$, the matrix $w^{(1)}$ including at least one eigenvector of the first reference time unit, and calculate, based on $w_1$ and $W_2^{(2)}$, the matrix $w^{(2)}$ including at least one eigenvector of the second reference time unit. One column of the matrix $w^{(1)}$ represents one eigenvector. One column of the matrix $w^{(2)}$ also represents one eigenvector.

That the PMI indicates the channel matrix is used as an example. The second communications apparatus may calculate the channel matrix $w^{(1)}$ of the first reference time unit based on $w_1$ and $W_2^{(1)}$, and calculate the channel matrix $w^{(2)}$ of the second reference time unit based on $w_1$ and $W_1^{(2)}$. When the PMI indicates the channel matrix, in one embodiment, one column of the matrix $w^{(1)}$ may represent a channel vector of one antenna port of the first communications apparatus in the first reference time unit, and one column of the matrix $w^{(2)}$ may also represent a channel vector of the antenna port of the first communications apparatus in the second reference time unit. That the PMI indicates the precoding matrix is used an example for description below. Details of another case are not described again.

It should be understood that, the CSI fed back by the first communications apparatus to the second communications apparatus may usually further include parameters such as a rank indication (RI) and a channel quality indication (CQI). The RI represents a quantity that is recommended by the first communications apparatus and that is of data layers simultaneously transmitted by the second communications apparatus to the first communications apparatus on same time-frequency resources, and the CQI indicates channel quality of the first communications apparatus, and is recommended to the second communications apparatus for the second communications apparatus to select a proper modulation scheme and a proper coding rate.

The third PMI may directly indicate the matrix $W_2^{(2)}$ corresponding to the second reference time unit, or may include a relative amplitude value and/or a relative phase value in the matrix $W_2^{(1)}$ and the matrix $W_2^{(2)}$. This is not limited in this embodiment of this application. However, it should be understood that, CSI feedback overheads of the first communications apparatus can be further reduced by using the relative amplitude value and/or the relative phase value.

Specifically, the matrix $w_1$ is a diagonal block matrix. To be specific, $$W_1 = \begin{bmatrix} A & 0 \\ 0 & A \end{bmatrix}.$$

The matrix A includes 1 column vectors, where $l \geq 1$, and $A=[b_0 \ b_1 \ L \ b_{l-1}]$ $b_s$ is a column vector whose length is $N_t/2$, where $N_t$ is a positive integer, and $s \in \{0,1,L,l-1\}$. The matrix $W_2^{(1)}$ and the matrix $W_2^{(2)}$ each are a matrix of 2l rows and N columns, where both l and N are positive integers. $W_2^{(1)}$ and $W_2^{(2)}$ may be classified into a first-type codebook and a second-type codebook based on a representation form.

For the first-type codebook, a representation form of an $n^{th}$ column of $W_2^{(1)}$ is $$W_2^{(1)}(n) = \begin{bmatrix} e_k \\ c_n^{(1)} e_k \end{bmatrix},$$

and a representation form of an $n^{th}$ column of $W_2^{(2)}$ is $$W_2^{(2)}(n) = \begin{bmatrix} e_k \\ c_n^{(2)} e_k \end{bmatrix},$$

where $n \in \{1,2,L,N-1\}$, $e_k$ is a l×1 column vector. A $k^{th}$ element of $e_k$ is 1, and a remaining element is 1. Both $c_n^{(1)}$ and $c_n^{(2)}$ are complex numbers whose modulus is 1, and may be represented as $$c_n^{(1)} = e^{j\varphi_n^{(1)}} \text{ and } c_n^{(2)} = e^{j\varphi_n^{(2)}},$$

where $\varphi_n^{(1)}$ represents a phase of the complex number $c_n^{(1)}$, and $\varphi_n^{(2)}$ represents a phase of the complex number $c_n^{(2)}$.

For the second-type codebook, a representation form of $W_2^{(1)}$ is:

$$W_2^{(1)} = \begin{bmatrix} h_{0,1,1} \cdot p_{0,1,1}^{(1)} \cdot c_{0,1,1}^{(1)} & h_{0,N,1} \cdot p_{0,N,1}^{(1)} \cdot c_{0,N,1}^{(1)} \\ h_{0,1,2} \cdot p_{0,1,2}^{(1)} \cdot c_{0,1,2}^{(1)} & h_{0,N,2} \cdot p_{0,N,2}^{(1)} \cdot c_{0,N,2}^{(1)} \\ M & M \\ h_{0,1,l} \cdot p_{0,1,l}^{(1)} \cdot c_{0,1,l}^{(1)} & h_{0,N,l} \cdot p_{0,N,l}^{(1)} \cdot c_{0,N,l}^{(1)} \\ h_{1,1,1} \cdot p_{1,1,1}^{(1)} \cdot c_{1,1,1}^{(1)} & L & h_{1,N,1} \cdot p_{1,N,1}^{(1)} \cdot c_{1,N,1}^{(1)} \\ h_{1,1,2} \cdot p_{1,1,2}^{(1)} \cdot c_{1,1,2}^{(1)} & h_{1,N,2} \cdot p_{1,N,2}^{(1)} \cdot c_{1,N,2}^{(1)} \\ M & M \\ h_{1,1,l} \cdot p_{1,1,l}^{(1)} \cdot c_{1,1,l}^{(1)} & h_{1,N,l} \cdot p_{1,N,l}^{(1)} \cdot c_{1,N,l}^{(1)} \end{bmatrix},$$

where $h_{x,y,z}$ and $p_{x,y,z}^{(1)}$ are real numbers, $c_{x,y,z}^{(1)}$ is a complex number whose modulus is 1, and $$c_{x,y,z}^{(1)} = e^{j\varphi_{x,y,z}^{(1)}},$$

where $\varphi_{x,y,z}^{(1)}$ represents a phase of the complex number $c_{x,y,z}^{(1)}$, x and z represent row numbers of $W_2^{(1)}$ and $W_2^{(2)}$, y represents column numbers of $W_2^{(1)}$ and $W_2^{(2)}$, $x \in \{0,1\}$, $y \in \{1,2,L,N\}$ and $z \in \{1,2,L,l\}$.

A representation form of $W_2^{(2)}$ is:

$$W_2^{(2)} = \begin{bmatrix} h_{0,1,1} \cdot p_{0,1,1}^{(2)} \cdot c_{0,1,1}^{(2)} & h_{0,N,1} \cdot p_{0,N,1}^{(2)} \cdot c_{0,N,1}^{(2)} \\ h_{0,1,2} \cdot p_{0,1,2}^{(2)} \cdot c_{0,1,2}^{(2)} & h_{0,N,2} \cdot p_{0,N,2}^{(2)} \cdot c_{0,N,2}^{(2)} \\ M & M \\ h_{0,1,l} \cdot p_{0,1,l}^{(2)} \cdot c_{0,1,l}^{(2)} & h_{0,N,l} \cdot p_{0,N,l}^{(2)} \cdot c_{0,N,l}^{(2)} \\ h_{1,1,1} \cdot p_{1,1,1}^{(2)} \cdot c_{1,1,1}^{(2)} & L & h_{1,N,1} \cdot p_{1,N,1}^{(2)} \cdot c_{1,N,1}^{(2)} \\ h_{1,1,2} \cdot p_{1,1,2}^{(2)} \cdot c_{1,1,2}^{(2)} & h_{1,N,2} \cdot p_{1,N,2}^{(2)} \cdot c_{1,N,2}^{(2)} \\ M & M \\ h_{1,1,l} \cdot p_{1,1,l}^{(2)} \cdot c_{1,1,l}^{(2)} & h_{1,N,l} \cdot p_{1,N,l}^{(2)} \cdot c_{1,N,l}^{(2)} \end{bmatrix},$$

where $h_{x,y,z}$ and $p_{x,y,z}^{(2)}$ are real numbers, $c_{x,y,z}^{(2)}$ is a complex number whose modulus is 1, and $$c_{x,y,z}^{(2)} = e^{j\varphi_{x,y,z}^{(2)}},$$

where $\varphi_{x,y,z}^{(2)}$ represents a phase of the complex number $c_{x,y,z}^{(2)}$, x and z represent row numbers of $W_2^{(1)}$ and $W_2^{(2)}$, y represents column numbers of $W_2^{(1)}$ and $W_2^{(2)}$, $x \in \{0,1\}$, $y \in \{1,2,L,N\}$ and $z \in \{1,2,L,l\}$.

In one embodiment, for the first-type codebook, the third PMI is used to indicate a relative phase value $\Delta c_n$, and the relative phase value $\Delta c_n$ is specifically used to represent a relative value between $c_n^{(2)}$ in an $n^{th}$ column in $W_2^{(2)}$ and a coefficient $c_n^{(1)}$ at a corresponding location in $W_2^{(1)}$.

In one embodiment, $\Delta c_n = \varphi_n^{(1)} = \varphi_n^{(2)}$, or $\Delta c_n = \varphi_n^{(2)} - \varphi_n^{(1)}$.

In one embodiment, for the second-type codebook, the third PMI is used to indicate a relative amplitude value $\Delta p_{x,y,z}$, and the relative amplitude value $\Delta p_{x,y,z}$ is specifically used to represent a relative value between an amplitude coefficient $p_{x,y,z}^{(2)}$ in an $(x \times l+z)^{th}$ row and a $y^{th}$ column in $W_2^{(2)}$ and an amplitude coefficient $p_{x,y,z}$ at a corresponding location in $W_2^{(1)}$; and/or the third PMI is used to indicate a relative phase value $\Delta c_{x,y,z}$, and the relative phase value $\Delta c_{x,y,z}$ is specifically used to represent a relative value between a phase coefficient $c_{x,y,z}^{(2)}$ in the $(x \times l+z)^{th}$ row and the $y^{th}$ column in $W_2^{(2)}$ and a phase coefficient $c_{x,y,z}^{(1)}$ at a corresponding location in $W_2^{(1)}$, where the matrices $W_2^{(1)}$ and $W_2^{(2)}$ each are a matrix of 2l rows and N columns, both l and N are positive integers, x and z represent row numbers of $W_2^{(1)}$ and $W_2^{(2)}$, y represents column numbers of $W_2^{(1)}$ and $W_2^{(2)}$, $x \in \{0,1\}$, $z \in \{1,2,L,l\}$, and $y \in \{1,2,L,N\}$.

It should be understood that, a relative value may represent a subtraction operation, or may represent a division operation. That is, the relative amplitude value $\Delta p_{x,y,z}$ may be a difference between $p_{x,y,z}^{(2)}$ and $p_{x,y,z}^{(1)}$, or may be a ratio of $p_{x,y,z}^{(2)}$ to $p_{x,y,z}^{(1)}$. The relative phase value $\Delta c_{x,y,z}$ is similar to the relative amplitude value $\Delta p_{x,y,z}$. This is not limited in this embodiment of this application. However, it should be understood that, a specific calculation manner needs to be agreed on in a protocol, or is configured by the second communications apparatus for the first communications apparatus by using signaling.

The following first describes a manner of calculating the relative value.

In one embodiment, $\Delta p_{x,y,z} = p_{x,y,z}^{(1)}/p_{x,y,z}^{(2)}$, or $\Delta p_{x,y,z} = p_{x,y,z}^{(2)}/p_{x,y,z}^{(1)}$.

In one embodiment, if $$c_{x,y,z}^{(1)} = e^{j\varphi_{x,y,z}^{(1)}}, \text{ and } c_{x,y,z}^{(2)} = e^{j\varphi_{x,y,z}^{(2)}},$$

$\Delta c_{x,y,z} = \varphi_{x,y,z}^{(1)} - \varphi_{x,y,z}^{(2)}$, or $\Delta c_{x,y,z} = \varphi_{x,y,z}^{(2)} - \varphi_{x,y,z}^{(1)}$, where $j^2 = -1$, $\varphi_{x,y,z}^{(1)}$ represents a phase of the complex number $c_{x,y,z}^{(1)}$, and $\varphi_{x,y,z}^{(2)}$ represents a phase of the complex number $c_{x,y,z}^{(2)}$.

It should be understood that, in this embodiment of this application, in addition to feeding back the first CSI to the second communications apparatus, the first communications apparatus may further feed back second CSI to the second communications apparatus. The second CSI is used to indicate a channel state in a time unit whose identifier is q. During specific implementation, the second CSI may be obtained by the first communications apparatus by performing channel measurement based on the reference signals, or may be predicted by the first communications apparatus based on the first CSI. This is not limited in this embodiment of this application.

In one embodiment, the first CSI includes a first PMI, a second PMI, a third PMI, and a sixth PMI, where the first PMI is used to indicate a matrix $w_1$ corresponding to the first reference time unit and the second reference time unit, the sixth PMI is used to indicate a matrix $W_3$ corresponding to the first reference time unit and the second reference time unit, the second PMI is used to indicate a matrix $w_2^{(1)'}$ corresponding to the first reference time unit, the third PMI is used to indicate a matrix $w_2^{(2)'}$ corresponding to the second reference time unit, a precoding matrix corresponding to the first reference time unit satisfies $w^{(1)'} = w_1 \times w_2^{(1)'} \times w_3$, and a precoding matrix corresponding to the second reference time unit satisfies $w^{(2)'} = w_1 \times w_2^{(2)'} \times w_3$.

Specifically, a PMI is used to indicate, from a predefined codebook, a precoding matrix that is of at least one layer of data and that is recommended by the first communications apparatus and is used for data transmission, a PMI is used to indicate a channel matrix of at least one antenna port of the first communications apparatus, a PMI is used to indicate a spatial correlation matrix of a channel matrix of at least one antenna port of the first communications apparatus, or a PMI is used to indicate at least one eigenvector of the spatial correlation matrix of the first communications apparatus.

The first CSI may include the first PMI, the second PMI, the third PMI, and the sixth PMI. The first PMI is used to indicate the matrix $w_1$. $w_1$ is applicable to both the first reference time unit and the second reference time unit. The second PMI is used to indicate the matrix $w_2^{(1)'}$ corresponding to the first reference time unit. The third PMI is used to indicate the matrix $W_2^{(2)'}$ corresponding to the second reference time unit. The sixth PMI is used to indicate the matrix $W_3$. $W_3$ is applicable to both the first reference time unit and the second reference time unit.

Specifically, the matrix $w_1$ is a diagonal block matrix. To be specific, $$W_1 = \begin{bmatrix} A & 0 \\ 0 & A \end{bmatrix}.$$

The matrix A includes l column vectors, where $l \geq 1$, and $A = [b_0 \ b_1 \ L \ b_{l-1}]$. $b_s$ is a column vector whose length is $N_t/2$, $N_t$ is a positive integer. $s \in \{0,1,L,l-1\}$. $w_3 = [f_0^T f_1^T L f_{N-1}^T]^T$, is a matrix of N" rows and F columns, and includes N" vectors $f_0, f_1, \ldots,$ and $f_{N-1}$. Each vector $f_i$ is a row vector whose length is F, where $i=0, 1, \ldots,$ and N"−1, and N" is a positive integer.

For example, forms of $w_2^{(1)'}$ and $w_2^{(2)'}$ may be similar to those of $W_2^{(1)}$ and $W_2^{(2)}$. x and z represent row numbers, and y represents column numbers.

In an optional embodiment, the third PMI is used to indicate a relative amplitude value $\Delta p_{x,y,z}$, and the relative amplitude value $\Delta p_{x,y,z}$ is specifically used to represent a relative value between an amplitude coefficient $p_{x,y,z}^{(2)}$ in an $(x \times l + z)^{th}$ row and a $y^{th}$ column in $w_2^{(2)'}$ and an amplitude coefficient $P_{x,y,z}^{(1)}$ at a corresponding location in $w_2^{(1)'}$; and/or the third PMI is used to indicate a relative phase value $\Delta c_{x,y,z}$, and the relative phase value $\Delta c_{x,y,z}$ is specifically used to represent a relative value between a phase coefficient $c_{x,y,z}^{(2)}$ in the $(x \times l + z)^{th}$ row and the $y^{th}$ column in $w_2^{(2)'}$ and a phase coefficient $c_{x,y,z}^{(1)}$ at a corresponding location in $w_2^{(1)'}$, where the matrices $w_2^{(1)'}$ and $w_2^{(2)'}$ each are a matrix of 2l rows and N" columns, l and N" are both positive integers, x and z represent row numbers of $w_2^{(1)'}$ and $w_2^{(2)'}$, y represents column numbers of $w_2^{(1)'}$ and $w_2^{(2)'}$, $x \in \{0,1\}$, $z \in \{1,2,L,l\}$, and $y \in \{1,2,L,N"\}$.

For example, a form of $w_2^{(t)'}$ (t=1, or t=2) is:

$$W_2^{(t)'} = \begin{bmatrix} p_{0,0}^{(t)} c_{0,0}^{(t)} & p_{0,1}^{(t)} c_{0,1}^{(t)} & L & p_{0,N''-1}^{(t)} c_{0,N''-1}^{(t)} \\ p_{1,0}^{(t)} c_{1,0}^{(t)} & p_{1,1}^{(t)} c_{1,1}^{(t)} & L & p_{1,N''-1}^{(t)} c_{1,N''-1}^{(t)} \\ M & M & O & M \\ p_{2l-1,0}^{(t)} c_{2l-1,0}^{(t)} & p_{2l-1,1}^{(t)} c_{2l-1,1}^{(t)} & L & p_{2l-1,N''-1}^{(t)} c_{2l-1,N''-1}^{(t)} \end{bmatrix},$$

where
$p_{x,y}^{(t)}$ is a real number, $c_{x,y}^{(t)}$ is a complex number whose modulus is 1, and $$c_{x,y}^{(t)} = e^{j\varphi_{x,y}^{(t)}},$$

where $\varphi_{x,y}^{(t)}$ represents a phase of the complex number $c_{x,y}^{(t)}$, x represents a row number of $W_2^{(1)}$ or $W_2^{(2)}$, y represents a column number of $w_2^{(1)'}$ or $w_2^{(2)'}$, $x \in \{0,1,2,L, 2l-1\}$, and $y \in \{0,1,L,N"-1\}$.

In one embodiment, F is a quantity of frequency domain units included in reporting bandwidth for the first CSI, and N"<F. In one embodiment, the frequency domain unit may be a subband, a subcarrier, or a resource block (RB), or may be in another form. This is not limited in this embodiment.

In one embodiment, the third PMI is used to indicate a relative amplitude value $\Delta p_{x,y}$, and the relative amplitude value $\Delta p_{x,y}$ is specifically used to represent a relative value between an amplitude coefficient $p_{x,y}^{(2)}$ in an $(x+1)^{th}$ row and a $(y+1)^{th}$ column in $w_2^{(2)'}$ and an amplitude coefficient $p_{x,y}^{(1)}$ at a corresponding location in $w_2^{(1)'}$; and/or the third PMI is used to indicate a relative phase value $\Delta c_{x,y}$, and the relative phase value $\Delta c_{x,y}$ is specifically used to represent a relative value between a phase coefficient $c_{x,y}^{(2)}$ in the $(x+1)^{th}$ row and the $(y+1)^{th}$ column in $w_2^{(2)'}$ and a phase coefficient $c_{x,y}^{(1)}$ at a corresponding location in $w_2^{(1)'}$, where the matrices $w_2^{(1)'}$ and $w_2^{(2)'}$ each are a matrix of 2l rows and N" columns, 1 and N" are both positive integers, x represents row numbers of $w_2^{(1)'}$ and $w_2^{(2)'}$, y represents column numbers of $w_2^{(1)'}$ and $w_2^{(2)'}$, $x \in \{0,1,L,2l-1\}$, $y \in \{0,1,L,N"-1\}$.

It should be understood that, for the foregoing two forms of the matrices, that x and z represent row numbers and y represents column numbers is used as an example for description below. Details of another case are not described again. It should be further understood that, alternatively, x may represent row numbers of $W_2^{(1)}$ and $W_2^{(2)}$, and y may represent column numbers of $W_2^{(1)}$ and $W_2^{(2)}$. Details are not described in this specification again.

The following describes in detail a method for predicting, by the first communications apparatus, the second CSI based on the first CSI.

In one embodiment, the method further includes:

determining, by the first communications apparatus based on the second PMI and the third PMI, a matrix $W_2^{(q)}$ or $w_2^{(q)'}$ that corresponds to a time unit whose identifier is q, where a precoding matrix corresponding to the time unit whose identifier is q satisfies $W^{(q)} = W_1 \times W_2^{(q)}$ or $w^{(q)'} = w_1 \times w_2^{(q)'} \times w_3$, the matrix $W_2^{(q)}$ is a matrix of 2l rows and N' columns, the matrix $w_2^{(q)'}$ is a matrix of 2l rows and N" columns, q is a positive integer greater than $m-n_1$ and $m-n_1-n_2$, and N' and N" are positive integers;

determining, by the first communications apparatus based on $W_2^{(q)}$ or $w_2^{(q)'}$, a second CQI in the time unit whose identifier is q; and sending, by the first communications apparatus, second CSI to the second communications apparatus, where the second CSI includes the second CQI.

Correspondingly, the second communications apparatus receives the second CSI from the first communications apparatus.

Specifically, the first communications apparatus may determine, based on the second PMI and the third PMI that are included in the first CSI, the matrix $W_2^{(q)}$ or $w_2^{(q)'}$ that corresponds to the time unit whose identifier is q, then determine, based on $W_2^{(q)}$ or $w_2^{(q)'}$, the second CQI in the time unit whose identifier is q, and then send the second CQI to the second communications apparatus. The matrix $W_2^{(q)}$ is a matrix of 2l rows and N' columns. Because $w_2^{(q)'}$ and $W_2^{(q)}$ are similar, $W_2^{(q)}$ is used as an example for description subsequently, and details of determining of $w_2^{(q)'}$ are not described again.

In one embodiment, $W_2^{(q)}$ is determined based on the second PMI, the third PMI, and an amplitude coefficient $p_{x,y,z}^{(q)}$ in an $(x \times l + z)^{th}$ row and a $y'^{th}$ column in $W_2^{(q)}$ and/or a phase coefficient $c_{x,y,z}^{(q)}$ in the $(x \times l + z)^{th}$ row and the $y'^{th}$ column in $W_2^{(q)}$, where $p_{x,y,z}^{(q)}$ and $c_{x,y,z}^{(q)}$ are calculated by using the following formulas:

$$p_{x,y',z}^{(q)} = p_{x,y',z}^{(1)} \times (\Delta p_{x,y',z})^Y, \text{ and}$$

$$c_{x,y',z}^{(q)} = e^{j(\varphi_{x,y',z}^{(1)} + Y \times \Delta c_{x,y',z})},$$

where

Y represents a ratio of a difference between the identifier q and the identifier of the first reference time unit to a difference between the identifier of the first reference time unit and the identifier of the second reference time unit $y' \in \{1,2,L\ N'\}$, and $N' \le N$.

Specifically, the first communications apparatus calculates the matrix $W_2^{(q)}$ corresponding to the time unit whose identifier is q, and may obtain the amplitude coefficient $p_{x,y',z}^{(q)}$ in the $(x \times l + z)^{th}$ row and the $y'^{th}$ column in $W_2^{(q)}$ based on an amplitude coefficient $p_{x,y',z}^{(1)}$ in an $(x \times l + z)^{th}$ row and a $y'^{th}$ column in the matrix $W_2^{(1)}$ indicated by the second PMI and a relative amplitude value $\Delta p_{x,y',z}$ that is in the $(x \times l + z)^{th}$ row and the $y'^{th}$ column and that is indicated by the third PMI. Likewise, the first communications apparatus may further obtain the phase coefficient $c_{x,y',z}^{(q)}$ in the $(x \times l + z)^{th}$ row and the $y'^{th}$ column in $W_2^{(q)}$ based on a phase coefficient $c_{x,y',z}^{(1)}$ in the $(x \times l + z)^{th}$ row and the $y'^{th}$ column in the matrix $W_2^{(1)}$ indicated by the second PMI and a relative phase value $\Delta c_{x,y',z}$ that is in the $(x \times l + z)^{th}$ row and the $y'^{th}$ column and that is indicated by the third PMI.

The following describes another manner of calculating the relative value.

In one embodiment, $\Delta p_{x,y,z} = p_{x,y,z}^{(1)} - p_{x,y,z}^{(2)}$, or $\Delta p_{x,y,z} = p_{x,y,z}^{(2)} - p_{x,y,z}^{(1)}$.

In one embodiment, $\Delta c_{x,y,z} = c_{x,y,z}^{(1)} - c_{x,y,z}^{(2)}$, or $\Delta c_{x,y,z} = c_{x,y,z}^{(2)} - c_{x,y,z}^{(1)}$.

In one embodiment, $W_2^{(q)}$ is determined based on the second PMI, the third PMI, and an amplitude coefficient $p_{x,y',z}^{(q)}$ in the $(x \times l + z)^{th}$ row and the $y'^{th}$ column in $W_2^{(q)}$ and/or a phase coefficient $c_{x,y',z}^{(q)}$ in the $(x \times l + z)^{th}$ row and the $y'^{th}$ column in $W_2^{(q)}$, where $p_{x,y',z}^{(q)}$ and $c_{x,y',z}^{(q)}$ are calculated by using the following formulas:

$$p_{x,y',z}^{(q)} = p_{x,y',z}^{(1)} + Y \times \Delta p_{x,y',z}, \text{ and}$$

$$c_{x,y',z}^{(q)} = c_{x,y',z}^{(1)} + Y \times \Delta c_{x,y',z}, \text{ where}$$

Y represents a ratio of a difference between an identifier q and the identifier of the first reference time unit to a difference between the identifier of the first reference time unit and the identifier of the second reference time unit $y' \in \{1,2,L\ N'\}$, and $N' \le N$.

Likewise, the first communications apparatus may determine, based on the second PMI and the third PMI that are included in the first CSI and according to the foregoing formulas, a matrix $W_2^{(q)}$ corresponding to a time unit whose identifier is q, then determine, based on $W_2^{(q)}$, a second CQI in the time unit whose identifier is q, and then send the second CQI to the second communications apparatus.

In one embodiment, $W_2^{(q)}$ is determined based on the second PMI, the third PMI, and an amplitude coefficient $p_{x,y',z}^{(q)}$ in the $(x \times l + z)^{th}$ row and the $y'^{th}$ column in $W_2^{(q)}$ and/or a phase coefficient $c_{x,y',z}^{(q)}$ in the $(x \times l + z)^{th}$ row and the $y'^{th}$ column in $W_2^{(q)}$, where $p_{x,y',z}^{(q)}$ and $c_{x,y',z}^{(q)}$ are calculated by using the following formulas:

$$p_{x,y',z}^{(q)} = p_{x,y',z}^{(1)} + Y \times \Delta p_{x,y',z}, \text{ and}$$

$$c_{x,y',z}^{(q)} = e^{j(\varphi_{x,y',z}^{(1)} + Y \times \Delta c_{x,y',z})},$$

where

Y represents a ratio of a difference between an identifier q and the identifier of the first reference time unit to a difference between the identifier of the first reference time unit and the identifier of the second reference time unit $y' \in \{1,2,L\ N'\}$, and $N' \le N$.

In one embodiment, $W_2^{(q)}$ is determined based on the second PMI, the third PMI, and an amplitude coefficient $p_{x,y',z}^{(q)}$ the $(x \times l+z)^{th}$ row and the $y'^{th}$ column in $W_2^{(q)}$ and/or a phase coefficient $c_{x,y',z}^{(q)}$ in the $(x \times l+z)^{th}$ row and the $y'^{th}$ column $W_2^{(q)}$, where $p_{x,y',z}^{(q)}$ and $c_{x,y',z}^{(q)}$ are calculated by using the following formulas:

$$p_{x,y',z}^{(q)} = p_{x,y',z}^{(1)} \times (\Delta p_{x,y',z})^Y, \text{ and}$$

$$c_{x,y',z}^{(q)} = c_{x,y',z}^{(1)} + Y \times \Delta c_{x,y',z}, \text{ where}$$

Y represents a ratio of a difference between an identifier q and the identifier of the first reference time unit to a difference between the identifier of the first reference time unit and the identifier of the second reference time unit, $y' \in \{1,2,L\ N'\}$, and $N' \leq N$.

The following describes a feedback of CSI of a single codebook structure.

In one embodiment, the first CSI includes a fourth PMI and a fifth PMI. The fourth PMI is used to indicate the precoding matrix $w^{(1)}$ corresponding to the first reference time unit, and the fifth PMI is used to indicate the precoding matrix $w^{(2)}$ corresponding to the second reference time unit.

Specifically, in the single codebook structure, the first CSI may directly include the fourth PMI used to indicate $w^{(1)}$ and the fifth PMI used to indicate $w^{(2)}$. The first communications apparatus reports the first CSI of the single codebook structure to the second communications apparatus. After receiving the first CSI, the second communications apparatus may directly determine, based on the first CSI, the precoding matrix $w^{(1)}$ corresponding to the first reference time unit and the precoding matrix $w^{(2)}$ corresponding to the second reference time unit, so that calculation complexity for the second communications apparatus is reduced.

In one embodiment, the fifth PMI is used to indicate a relative coefficient value $\Delta w_{r,t}$, and the relative coefficient value $\Delta w_{r,t}$ is specifically used to represent a relative value between a coefficient $w_{r,t}^{(2)}$ in an $r^{th}$ row and a $t^{th}$ column in $w^{(2)}$ and a coefficient $w_{r,t}^{(1)}$ at a corresponding location in $w^{(1)}$, where the matrices $w^{(1)}$ and $w^{(2)}$ each are a matrix of $N_t$ rows and N columns, both $N_t$ and N are positive integers, r represents row numbers of $w^{(1)}$ and $w^{(2)}$, t represents column numbers of $w^{(1)}$ and $w^{(2)}$, $r \in \{1,2,L,N_t\}$, and $t \in \{1, 2, L, N\}$.

It should be understood that, a relative value may represent a subtraction operation, or may represent a division operation. That is, the relative coefficient value $\Delta w_{r,t}$ may be a difference between $w_{r,t}^{(2)}$ and $w_{r,t}^{(1)}$, or may be a ratio of $w_{r,t}^{(2)}$ to $w_{r,t}^{(1)}$. However, it should be understood that, a specific calculation manner needs to be agreed on in a protocol, or is configured by the second communications apparatus for the first communications apparatus by using signaling.

In one embodiment, the method further includes:

determining, by the first communications apparatus based on the fourth PMI and the fifth PMI, a matrix $W_2^{(q)}$ corresponding to a time unit whose identifier is q, where the matrix $W_2^{(q)}$ is a matrix of $N_t$ rows and N' columns, and q is a positive integer greater than $m-n_1$ and $m-n_1-n_2$;

determining, by the first communications apparatus based on $W_2^{(q)}$, a second CQI in the time unit whose identifier is q; and sending, by the first communications apparatus, second CSI to the second communications apparatus, where the second CSI includes the second CQI.

Correspondingly, the second communications apparatus receives the second CSI from the first communications apparatus.

In one embodiment, the method further includes:

sending, by the second communications apparatus, configuration information to the first communications apparatus, where the configuration information is used to indicate that the second CSI depends on the first CSI.

Correspondingly, the first communications apparatus receives the configuration information from the second communications apparatus.

The determining, by the first communications apparatus based on the second PMI and the third PMI, a matrix $W_2^{(q)}$ corresponding to a time unit whose identifier is q includes:

determining, by the first communications apparatus, $W_2^{(q)}$ based on the configuration information, the second PMI, and the third PMI.

Specifically, the second communications apparatus may send the configuration information to the first communications apparatus, to indicate that the second CSI depends on the first CSI. In this way, in the double codebook structure, the first communications apparatus may calculate $W_2^{(q)}$ based on the second PMI and the third PMI that are included in the first CSI, thereby calculating the second CQI. In the single codebook structure, the first communications apparatus may calculate $W^{(q)}$ based on the fourth PMI and the fifth PMI that are included in the first CSI, thereby calculating the second CQI. In a possible implementation, the configuration information may be a CSI reporting index.

In one embodiment, before the first communications apparatus receives the reference signals from the second communications apparatus, the method further includes:

sending, by the second communications apparatus, first indication information to the first communications apparatus, where the first indication information is used to indicate transmission of at least two reference signals; and correspondingly, receiving, by the first communications apparatus, the first indication information from the second communications apparatus.

That the second communications apparatus sends the reference signals to the first communications apparatus includes:

sending, by the second communications apparatus, a first reference signal and a second reference signal to the first communications apparatus, where the first reference signal is used to measure the channel state in the first reference time unit, and the second reference signal is used to measure the channel state in the second reference time unit.

That the first communications apparatus receives the reference signals from the second communications apparatus includes:

receiving, by the first communications apparatus, the first reference signal and the second reference signal from the second communications apparatus based on the first indication information.

In this embodiment of this application, one piece of trigger signaling of the second communications apparatus may trigger transmission of at least two reference signals. Specifically, the second communications apparatus may send the first indication information to the first communications apparatus, to indicate the transmission of the at least two reference signals. The second communications apparatus sends the first reference signal and the second reference signal to the first communications apparatus. The first communications apparatus measures the channel state in the first reference time unit by using the first reference signal, measures the channel state in the second reference time unit by using the second reference signal, and reports the first CSI to the second communications apparatus in combination with the channel state in the first reference time unit and the channel state in the second reference time unit. It should be understood that, the first indication information, the first reference signal, and the second reference signal may be separately sent, or may be simultaneously sent. This is not limited in this embodiment of this application.

In one embodiment, the method further includes: sending, by the first communications apparatus, second indication information to the second communications apparatus, where the second indication information is used to indicate whether the first CSI is available.

Correspondingly, the second communications apparatus receives the second indication information from the first communications apparatus.

Specifically, the first communications apparatus may further send second indication information to the second communications apparatus, to indicate whether the first CSI is available. When receiving the second indication information used to indicate that the first CSI is unavailable, the second communications apparatus may determine that the first communications apparatus no longer calculates the second CSI based on the first CSI, or the second communications apparatus no longer performs channel prediction based on the first CSI. Further, the first communications apparatus may specifically indicate, in the second indication information, a moment after which the first CSI is unavailable. This is not limited in this embodiment of this application.

In one embodiment, for a periodic CSI reporting mode, the first CSI is sent by the first communications apparatus at a reporting moment in a first reporting periodicity, and the second CSI is sent by the first communications apparatus at a reporting moment in a second reporting periodicity, where the first reporting periodicity is greater than the second reporting periodicity.

Specifically, CSI reporting is classified into two reporting modes: periodic CSI reporting and aperiodic CSI reporting. In this embodiment of this application, two types of CSI are reported. A first type of CSI may include an RI, the first PMI, the second PMI, the third PMI, and a CQI. A second type of CSI includes only a CQI. In the periodic CSI reporting mode, the first type of CSI may correspond to a longer reporting periodicity (that is, the first reporting period), and the second type of CSI may correspond to a shorter reporting periodicity (that is, the second reporting period).

It should be understood that, because the CQI in the second type of CSI is calculated based on the second PMI and the third PMI in the first type of CSI, it may be agreed on in a protocol that information reported at a reporting periodicity point of the first type of CSI that is closest to a current second type of CSI before a reporting periodicity point of the current second type of CSI is used as a reference to calculate a second type of CSI that needs to be reported currently. However, this is not limited in this embodiment of this application.

In one embodiment, a value of $n_1$ is agreed on in a protocol or configured by the second communications apparatus for the first communications apparatus by using signaling; and/or a value of $n_2$ is agreed on in a protocol or configured by the second communications apparatus for the first communications apparatus by using signaling.

Figure 3:
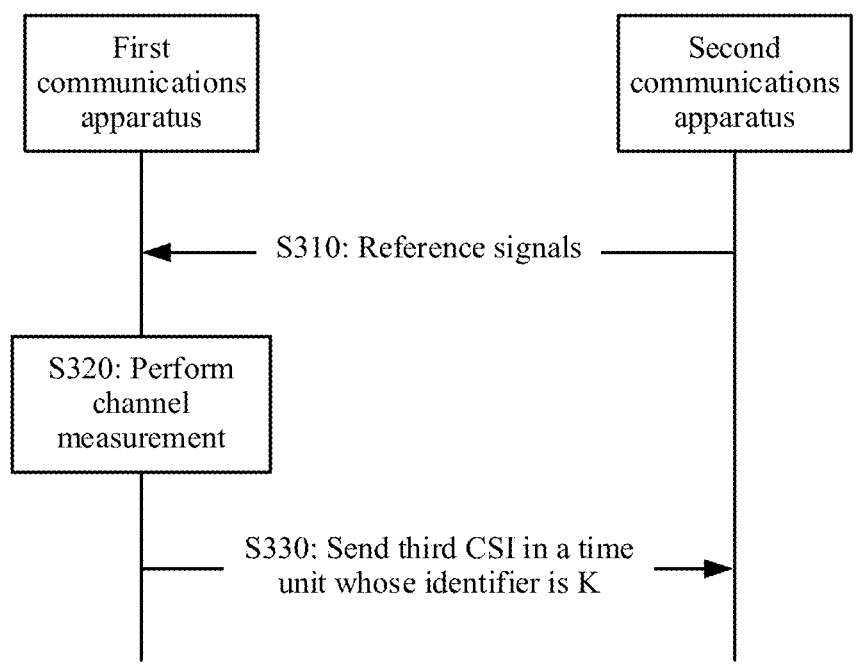
FIG. 3 is a schematic flowchart of another CSI reporting method according to an embodiment of this application.

FIG. 3 is a schematic flowchart of a CSI reporting method 300 according to an embodiment of this application. The method 300 may be applied to the communications system 100 shown in FIG. 1. However, this embodiment of this application is not limited thereto.

Operation S310: A second communications apparatus sends reference signals to a first communications apparatus, and correspondingly, the first communications apparatus receives the reference signals from the second communications apparatus.

Operation S320: The first communications apparatus performs channel measurement based on the reference signals.

Operation S330: The first communications apparatus sends third channel state information CSI to the second communications apparatus in a time unit whose identifier is K, where the third CSI is used to indicate a channel state in a third reference time unit, where an identifier of the third reference time unit is K+$n_3$, K is an integer, and $n_3$ is a positive integer.

Specifically, to obtain the channel state information CSI, the second communications apparatus may send the reference signals to the first communications apparatus. The first communications apparatus receives the reference signals, performs channel measurement, and feeds back the obtained first CSI to the second communications apparatus. In this embodiment of this application, the first communications apparatus feeds back the third CSI to the second communications apparatus in the time unit whose identifier is K, and the third CSI is used to indicate the channel state of the third reference time unit whose identifier is K+$n_3$. Further, the second communications apparatus obtains the third CSI, and performs subsequent data transmission based on the third CSI. The third CSI reporting may be periodic CSI reporting, or may be aperiodic CSI reporting.

It should be understood that, the CSI fed back by the first communications apparatus is relatively sensitive to a delay. Particularly for the first communications apparatus at a relatively high moving speed, because the CSI reflects a channel state at a measurement moment, if moving of the first communications apparatus causes a change of a channel, the CSI received by the second communications apparatus cannot completely reflect a channel state at a current moment. In this case, if the second communications apparatus directly applies the CSI fed back by the first communications apparatus, a matching degree between the CSI and a channel that is at the current moment is caused to decrease, and data transmission performance is affected.

However, in the CSI reporting method in this embodiment of this application, the first communications apparatus may feed back the third CSI to the second communications apparatus in the time unit whose identifier is K, where the third CSI indicates the channel state in the third reference time unit whose identifier is K+$n_3$, so that the second communications apparatus directly obtains a latest channel state. This helps improve a matching degree between CSI applied by the second communications apparatus and the channel that is at the current moment, thereby improving data transmission performance.

It should be understood that, in some embodiments, the reference time unit may be represented by using a reference resource. The reference resource may usually include a time domain resource and a frequency domain resource. The time domain resource is the reference time unit. However, this is not limited in this embodiment of this application.

It should be further understood that, the first communications apparatus may be a terminal device, and the second communications apparatus may be a network device. However, this is not limited in this embodiment of this application. In a specific implementation, the reference signal is a channel state information-reference signal (CSI-RS).

In the foregoing method 300, signaling may be directly transmitted between the first communications apparatus and the second communications apparatus, or may be indirectly transmitted between the first communications apparatus and the second communications apparatus, to be specific, be transmitted by using a relay device. Therefore, this embodiment of this application may be further applied to an application scenario in which there is a relay device or an application scenario for device-to-device (D2D) communication. This is not limited in this embodiment of this application.

In one embodiment, the third CSI includes a seventh PMI and an eighth PMI, where the seventh PMI is used to indicate a matrix $w_1$ corresponding to the third reference time unit, the eighth PMI is used to indicate a matrix $W_2^{(3)}$ corresponding to the third reference time unit, and a precoding matrix corresponding to the third reference time unit satisfies $W^{(3)}=W_1 \times W_2^{(3)}$.

In one embodiment, the third CSI includes a seventh PMI, an eighth PMI, and a ninth PMI, where the seventh PMI is used to indicate a matrix $w_1$ corresponding to the third reference time unit, the ninth PMI is used to indicate a matrix $W_3$ corresponding to the third reference time unit, the eighth PMI is used to indicate a matrix $W_2^{(3)'}$ corresponding to the third reference time unit, and a precoding matrix corresponding to the third reference time unit satisfies $W^{(3)'}=W_1 \times W_2^{(3)'} \times W_3$.

It should be understood that, specific forms of the matrices in this embodiment are similar to that of the foregoing matrices, and are not listed one by one herein again.

In one embodiment, before the first communications apparatus receives the reference signals from the second communications apparatus, the method further includes:

receiving, by the first communications apparatus, third indication information from the second communications apparatus, where the third indication information is used to indicate transmission of at least two reference signals.

That the first communications apparatus receives the reference signals from the second communications apparatus includes:

receiving, by the first communications apparatus, a third reference signal and a fourth reference signal from the second communications apparatus based on the third indication information.

The method further includes: determining, by the first communications apparatus, the third CSI based on the third reference signal and the fourth reference signal.

In this embodiment of this application, one piece of trigger signaling of the second communications apparatus may trigger transmission of at least two reference signals. Specifically, the second communications apparatus may send the third indication information to the first communications apparatus, to indicate the transmission of the at least two reference signals. The second communications apparatus sends the third reference signal and the fourth reference signal to the first communications apparatus. The first communications apparatus obtains, based on the third reference signal and the fourth reference signal, the third CSI used to indicate the channel state of the third reference time unit whose identifier is $K+n_3$, and reports the third CSI to the second communications apparatus. It should be understood that, the third indication information, the third reference signal, and the fourth reference signal may be separately sent, or may be simultaneously sent. This is not limited in this embodiment of this application.

In one embodiment, the first communications apparatus receives fourth indication information from the second communications apparatus, where the fourth indication information is used to indicate time domain positions of the at least two reference signals, and time domain positions of all of the at least two reference signals are different.

Specifically, the second communications apparatus may send the fourth indication information to the first communications apparatus, to indicate the time domain positions (for example, CSI-RS resources) of the at least two reference signals. In this embodiment of this application, when the time domain locations of the at least two reference signals are configured, the third CSI reported by the first communications apparatus may include an RI, a PMI, and a CQI, but does not include a reference signal resource indicator (CRI).

It should be understood that, the sequence numbers of the foregoing processes do not mean execution sequences. The execution sequences of the processes should be determined based on functions and internal logic of the processes, and should not be construed as any limitation on the implementation processes of the embodiments of this application.

The foregoing describes the CSI reporting methods in the embodiments of this application in detail with reference to FIG. 1 to FIG. 3. The following describes CSI reporting apparatuses in the embodiments of this application in detail with reference to FIG. 4 to FIG. 9.

Figure 4:
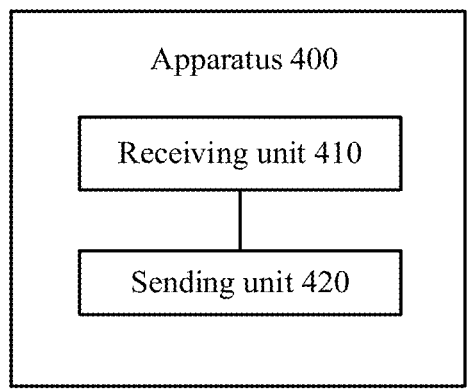
FIG. 4 is a schematic block diagram of a CSI reporting apparatus according to an embodiment of this application.

FIG. 4 shows a CSI reporting apparatus 400 according to an embodiment of this application. The apparatus 400 includes:

a receiving unit 410, configured to receive reference signals from a second communications apparatus; and a sending unit 420, configured to perform channel measurement based on the reference signals, and send first channel state information CSI to the second communications apparatus in a time unit whose identifier is m, where the first CSI is used to indicate a channel state in a first reference time unit and a channel state in a second reference time unit, where an identifier of the first reference time unit is $m-n_1$, an identifier of the second reference time unit is $m-n_1-n_2$, m, $n_1$, and $n_2$ are integers, and $n_2$ is not equal to 0.

The CSI reporting apparatus in this embodiment of this application may feed back channel states in at least two time units to the second communications apparatus in one CSI feedback, so that the second communications apparatus estimates CSI to be applied. This helps improve a matching degree between the CSI applied by the second communications apparatus and a channel that is at a current moment, thereby improving data transmission performance.

In one embodiment, the first CSI includes a first precoding matrix indicator PMI, a second PMI, and a third PMI, where the first PMI is used to indicate a matrix $w_1$ corresponding to the first reference time unit and the second reference time unit, the second PMI is used to indicate a matrix $W_2^{(2)}$ corresponding to the first reference time unit, the third PMI is used to indicate a matrix $W_2^{(2)}$ corresponding to the second reference time unit, a precoding matrix corresponding to the first reference time unit satisfies $W^{(1)}=W_1 \times W_2^{(1)}$, and a precoding matrix corresponding to the second reference time unit satisfies $W^{(2)}=W_1 \times W_2^{(2)}$.

In one embodiment, the third PMI is used to indicate a relative amplitude value $\Delta p_{x,y,z}$, and the relative amplitude value $\Delta p_{x,y,z}$ is specifically used to represent a relative value between an amplitude coefficient $p_{x,y,z}^{(2)}$ in an $(x \times l + z)^{th}$ row and a $y^{th}$ column in $W_2^{(2)}$ and an amplitude coefficient $p_{x,y,z}^{(1)}$ at a corresponding location in $W_2^{(1)}$; and/or the third PMI is used to indicate a relative phase value $\Delta c_{x,y,z}$, and the relative phase value $\Delta c_{x,y,z}$ is specifically used to represent a relative value between a phase coefficient $c_{x,y,z}^{(2)}$ in the $(x \times l + z)^{th}$ row and the $y^{th}$ column in $W_2^{(2)}$ and a phase coefficient $x_{x,y,z}^{(1)}$ at a corresponding location in $W_2^{(1)}$, where the matrices $W_2^{(1)}$ and $W_2^{(2)}$ each are a matrix of 2l rows and N columns, both 1 and N are positive integers, x and z represent row numbers of $W_2^{(1)}$ and $W_2^{(2)}$, y represents column numbers of $W_2^{(1)}$ and $W_2^{(2)}$, $x \in \{0,1\}$, $z \in \{1,2,L,l\}$, and $y \in \{1,2,L,N\}$.

In one embodiment, $\Delta p_{x,y,z} = p_{x,y,z}^{(1)}/p_{x,y,z}^{(2)}$, or $\Delta p_{x,y,z} = p_{x,y,z}^{(2)}/p_{x,y,z}^{(1)}$.

In one embodiment, if $$c_{x,y,z}^{(1)} = e^{j\varphi_{x,y,z}^{(1)}}, \text{ and } c_{x,y,z}^{(2)} = e^{j\varphi_{x,y,z}^{(2)}},$$

$\Delta c_{x,y,z} = \varphi_{x,y,z}^{(1)} - \varphi_{x,y,z}^{(2)}$, or $\Delta c_{x,y,z} = \varphi_{x,y,z}^{(2)} - \varphi_{x,y,z}^{(1)}$, where $j^2 = -1$.

In one embodiment, the first CSI includes a first PMI, a second PMI, a third PMI, and a sixth PMI, where the first PMI is used to indicate a matrix $w_1$ corresponding to the first reference time unit and the second reference time unit, the sixth PMI is used to indicate a matrix $W_3$ corresponding to the first reference time unit and the second reference time unit, the second PMI is used to indicate a matrix $w_2^{(1)'}$ corresponding to the first reference time unit, the third PMI is used to indicate a matrix $w_2^{(2)'}$ corresponding to the second reference time unit, a precoding matrix corresponding to the first reference time unit satisfies $w^{(1)'} = w_1 \times w_2^{(1)'} \times w_3$, and a precoding matrix corresponding to the second reference time unit satisfies $w^{(2)'} = w_1 \times w_2^{(2)'} \times w_3$.

In one embodiment, the third PMI is used to indicate a relative amplitude value $\Delta p_{x,y,z}$, and the relative amplitude value $\Delta p_{x,y,z}$ is specifically used to represent a relative value between an amplitude coefficient $p_{x,y,z}^{(2)}$ in an $(x \times l+z)^{th}$ row and a $y^{th}$ column in $w_2^{(2)'}$ and an amplitude coefficient $p_{x,y,z}^{(1)}$ at a corresponding location in $w_2^{(1)'}$; and/or the third PMI is used to indicate a relative phase value $\Delta c_{x,y,z}$, and the relative phase value $\Delta c_{x,y,z}$ is specifically used to represent a relative value between a phase coefficient $c_{x,y,z}^{(2)}$ in the $(x \times l+z)^{th}$ row and the $y^{th}$ column in $w_2^{(2)'}$ and a phase coefficient $c_{x,y,z}^{(1)}$ at a corresponding location in $w_2^{(1)'}$, where the matrices $w_2^{(1)'}$ and $w_2^{(2)'}$ each are a matrix of 2l rows and N" columns, l and N" are both positive integers, x and z represent row numbers of $w_2^{(1)'}$ and $w_2^{(2)'}$, y represents column numbers $w_2^{(1)'}$ and $w_2^{(2)'}$, $x \in \{0,1\}$, $z \in \{1,2,L,l\}$, and $y \in \{1,2,L,N"\}$.

In one embodiment, the third PMI is used to indicate a relative amplitude value $\Delta p_{x,y}$, and the relative amplitude value $\Delta p_{x,y}$ is specifically used to represent a relative value between an amplitude coefficient $p_{x,y}^{(2)}$ in an $(x+1)^{th}$ row and a $(y+1)^{th}$ column in $w_2^{(4)'}$ and an amplitude coefficient $p_{x,y}^{(1)}$ at a corresponding location in $w_2^{(1)'}$; and/or the third PMI is used to indicate a relative phase value $\Delta c_{x,y}$, and the relative phase value $\Delta c_{x,y}$ is specifically used to represent a relative value between a phase coefficient $c_{x,y}^{(2)}$ in the $(x+1)^{th}$ row and the $(y+1)^{th}$ column in $w_2^{(2)'}$ and a phase coefficient $c_{x,y}^{(1)}$ at a corresponding location in $w_2^{(1)'}$, where the matrices $w_2^{(1)'}$ and $w_2^{(2)'}$ each are a matrix of 2l rows and columns, l and N" are both positive integers, x represents row numbers of $w_2^{(1)'}$ and $w_2^{(2)'}$, y represents column numbers of $w_2^{(1)'}$ and $w_2^{(2)'}$, $x \in \{0,1,L,2l-1\}$, and $y \in \{0,1,L,N"-1\}$.

In one embodiment, the apparatus further includes a first processing unit, configured to: determine, based on the second PMI and the third PMI, a matrix $W_2^{(q)}$ and $w_2^{(q)'}$ that corresponds to a time unit whose identifier is q, where a precoding matrix corresponding to the time unit whose identifier is q satisfies $W^{(q)} = W_1 \times W_2^{(q)}$ or $w^{(q)'} = w_1 \times w_2^{(q)'} \times w_3$, the matrix $W_2^{(q)}$ is a matrix of 2l rows and N' columns, the matrix $w_2^{(q)'}$ is a matrix of 2l rows and N" columns, q is a positive integer greater than $m-n_1$ and $m-n_1-n_2$, and N' and N" are positive integers; and determine, based on $W_2^{(q)}$ and $w_2^{(q)'}$, a second CQI in the time unit whose identifier is q; and the sending unit 420 is further configured to send second CSI to the second communications apparatus, where the second CSI includes the second CQI.

In one embodiment, $W_2^{(q)}$ is determined based on the second PMI, the third PMI, and an amplitude coefficient $p_{x,y',z}^{(q)}$ in an $(x \times l+z)^{th}$ row and a $y'^{th}$ column in $W_2^{(q)}$ and/or a phase coefficient $c_{x,y',z}^{(q)}$ in the $(x \times l+z)^{th}$ row and the $y'^{th}$ column in $W_2^{(q)}$, where $p_{x,y',z}^{(q)}$ and $c_{x,y',z}^{(q)}$ are calculated by using the following formulas:

$$p_{x,y',z}^{(q)} = p_{x,y',z}^{(1)} \times (\Delta p_{x,y',z})^Y, \text{ and}$$

$$c_{x,y',z}^{(q)} = e^{j\left(\varphi_{x,y',z}^{(1)} + Y \times \Delta c_{x,y',z}\right)},$$

where

Y represents a ratio of a difference between the identifier q and the identifier of the first reference time unit to a difference between the identifier of the first reference time unit and the identifier of the second reference time unit, and $y' \in \{1,2,L\ N'\}$.

In one embodiment, $\Delta p_{x,y,z} = p_{x,y,z}^{(1)} - p_{x,y,z}^{(2)}$, or $\Delta p_{x,y,z} = p_{x,y,z}^{(2)} - p_{x,y,z}^{(1)}$.

In one embodiment, $\Delta c_{x,y,z} = c_{x,y,z}^{(1)} - c_{x,y,z}^{(2)}$, or $\Delta c_{x,y,z} = c_{x,y,z}^{(2)} - c_{x,y,z}^{(1)}$.

In one embodiment, $W_2^{(q)}$ is determined based on the second PMI, the third PMI, and amplitude coefficient $p_{x,y',z}^{(q)}$ in the $(x \times l+z)^{th}$ row and the $y'^{th}$ column in $W_2^{(q)}$ and/or a phase coefficient $c_{x,y',z}^{(q)}$ in the $(x \times l+z)^{th}$ row and the $y'^{th}$ column in $W_2^{(q)}$, where $p_{x,y',z}^{(q)}$ and $c_{x,y',z}^{(q)}$ are calculated by using the following formulas:

$$p_{x,y',z}^{(q)} = p_{x,y',z}^{(1)} + Y \times \Delta p_{x,y',z}, \text{ and}$$

$$c_{x,y',z}^{(q)} = c_{x,y',z}^{(1)} + Y \times \Delta c_{x,y',z}, \text{ where}$$

Y represents a ratio of a difference between the identifier q and the identifier of the first reference time unit to a difference between the identifier of the first reference time unit and the identifier of the second reference time unit, and $y' \in \{1,2,L\ N'\}$.

In one embodiment, the first CSI includes a fourth PMI and a fifth PMI. The fourth PMI is used to indicate the precoding matrix $w^{(1)}$ corresponding to the first reference time unit, and the fifth PMI is used to indicate the precoding matrix $w^{(2)}$ corresponding to the second reference time unit.

In one embodiment, the fifth PMI is used to indicate a relative coefficient value $\Delta w_{r,t}$ and the relative coefficient value $\Delta w_{r,t}$ is specifically used to represent a relative value between a coefficient $w_{r,t}^{(2)}$ in an $r^{th}$ row and a $t^{th}$ column in $W^{(2)}$ and a coefficient $w_{r,t}^{(1)}$ at a corresponding location in $w^{(1)}$, where the matrices $w^{(1)}$ and $w^{(2)}$ each are a matrix of $N_t$ rows and N columns, both $N_t$ and N are positive integers, r represents row numbers of $w^{(1)}$ and $w^{(2)}$, t represents column numbers of $w^{(1)}$ and $w^{(2)}$, $r \in \{1,2,L,N_t\}$, and $t \in \{1, 2L, N\}$.

In one embodiment, the apparatus further includes a second processing unit, configured to: determine, based on the fourth PMI and the fifth PMI, a matrix $W_2^{(q)}$ corresponding to a time unit whose identifier is q, where the matrix $W_2^{(q)}$ is a matrix of $N_t$ rows and N' columns, and q is a positive integer greater than m−$n_1$ and m−$n_1$−$n_2$; and determine, based on $W_2^{(q)}$, a second CQI in the time unit whose identifier is q; and the sending unit 420 is further configured to send second CSI to the second communications apparatus, where the second CSI includes the second CQI.

In one embodiment, the receiving unit 410 is further configured to receive configuration information from the second communications apparatus, where the configuration information is used to indicate that the second CSI depends on the first CSI; and the processing unit is specifically configured to determine $W_2^{(q)}$ based on the configuration information, the second PMI, and the third PMI.

In one embodiment, the receiving unit 410 is specifically configured to: receive first indication information from the second communications apparatus, where the first indication information is used to indicate transmission of at least two reference signals; and receive a first reference signal and a second reference signal from the second communications apparatus based on the first indication information, where the first reference signal is used to measure the channel state in the first reference time unit, and the second reference signal is used to measure the channel state in the second reference time unit.

In one embodiment, the sending unit 420 is further configured to send second indication information to the second communications apparatus, where the second indication information is used to indicate whether the first CSI is available.

In one embodiment, for a periodic CSI reporting mode, the first CSI is sent by the first communications apparatus at a reporting moment in a first reporting periodicity, and the second CSI is sent by the first communications apparatus at a reporting moment in a second reporting periodicity, where the first reporting periodicity is greater than the second reporting periodicity.

In one embodiment, a value of $n_1$ is agreed on in a protocol or configured by the second communications apparatus for the first communications apparatus by using signaling; and/or a value of $n_2$ is agreed on in a protocol or configured by the second communications apparatus for the first communications apparatus by using signaling.

It should be understood that, the apparatus 400 herein is presented in a form of function units. The term "unit" herein may be an application-specific integrated circuit (ASIC), an electronic circuit, a processor (for example, a shared processor, a dedicated processor, or a group processor) configured to execute one or more software or firmware programs, a memory, a merged logic circuit, and/or another suitable component that supports the described function. In an optional example, a person skilled in the art may understand that the apparatus 400 may be specifically the first communications apparatus in the embodiment 200, and the apparatus 400 may be configured to perform procedures and/or operations corresponding to the first communications apparatus in the method embodiment 200. To avoid repetition, details are not described herein again.

Figure 5:
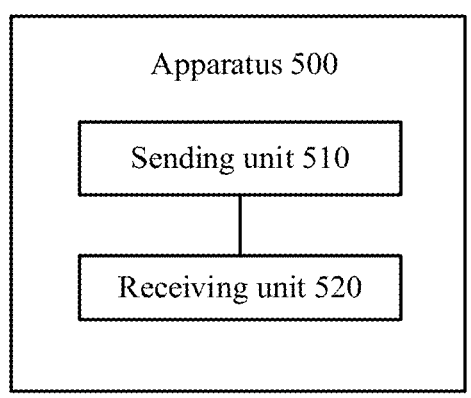
FIG. 5 is a schematic block diagram of another CSI reporting apparatus according to an embodiment of this application.

FIG. 5 shows another CSI reporting apparatus 500 according to an embodiment of this application. The apparatus 500 includes:

a sending unit 510, configured to send reference signals to a first communications apparatus; and a receiving unit 520, configured to receive first channel state information CSI sent by the first communications apparatus based on the reference signals in a time unit whose identifier is m, where the first CSI is used to indicate a channel state in a first reference time unit and a channel state in a second reference time unit, where an identifier of the first reference time unit is m−$n_1$, an identifier of the second reference time unit is m−$n_1$−$n_2$, m, $n_1$, and $n_2$ are integers, and $n_2$ is not equal to 0.

The CSI reporting apparatus in this embodiment of this application may obtain channel states in at least two time units in one CSI feedback, so that the apparatus estimates CSI to be applied. This helps improve a matching degree between the CSI applied by the second communications apparatus and a channel that is at a current moment, thereby improving data transmission performance.

In one embodiment, the first CSI includes a first precoding matrix indicator PMI, a second PMI, and a third PMI, where the first PMI is used to indicate a matrix $w_1$ corresponding to the first reference time unit and the second reference time unit, the second PMI is used to indicate a matrix $W_2^{(1)}$ corresponding to the first reference time unit, the third PMI is used to indicate a matrix $W_2^{(2)}$ corresponding to the second reference time unit, a precoding matrix corresponding to the first reference time unit satisfies $W^{(1)}=W_1 \times W_2^{(1)}$, and a precoding matrix corresponding to the second reference time unit satisfies $W^{(2)}=W_1 \times W_2^{(2)}$.

In one embodiment, the third PMI is used to indicate a relative amplitude value $\Delta p_{x,y,z}$, and the relative amplitude value $\Delta p_{x,y,z}$ is specifically used to represent a relative value between an amplitude coefficient $p_{x,y,z}^{(2)}$ in an (x×l+z)$^{th}$ row and a y$^{th}$ column in $W_2^{(2)}$ and an amplitude coefficient $p_{x,y,z}^{(1)}$ at a corresponding location in $W_2^{(1)}$; and/or the third PMI is used to indicate a relative phase value $\Delta c_{x,y,z}$, and the relative phase value $\Delta c_{x,y,z}$ is specifically used to represent a relative value between a phase coefficient in the (x×l+z)$^{th}$ row and the y$^{th}$ column in $W_2^{(2)}$ and a phase coefficient $c_{x,y,z}^{(1)}$ at a corresponding location in $W_2^{(1)}$, where the matrices $W_2^{(1)}$ and $W_2^{(2)}$ each are a matrix of 2l rows and N columns, both l and N are positive integers, x and z represent row numbers of $W_2^{(1)}$ and $W_2^{(2)}$, y represents column numbers of $W_2^{(1)}$ and $W_2^{(2)}$, x∈{0,1}, z∈{1,2,L,l}, and y∈{1,2,L,N}.

In one embodiment, $\Delta p_{x,y,z}=p_{x,y,z}^{(1)}/p_{x,y,z}^{(2)}$, or $\Delta p_{x,y,z}=p_{x,y,z}^{(2)}/p_{x,y,z}^{(1)}$.

In one embodiment, if $$c_{x,y,z}^{(1)} = e^{j\varphi_{x,y,z}^{(1)}}, \text{ and } c_{x,y,z}^{(2)} = e^{j\varphi_{x,y,z}^{(2)}},$$

$\Delta c_{x,y,z}=\varphi_{x,y,z}^{(1)}-\varphi_{x,y,z}^{(2)}$, or $\Delta c_{x,y,z}=\varphi_{x,y,z}^{(2)}-\varphi_{x,y,z}^{(1)}$, where $j^2=-1$.

In one embodiment, the first CSI includes a first PMI, a second PMI, a third PMI, and a sixth PMI, where the first PMI is used to indicate a matrix $w_1$ corresponding to the first reference time unit and the second reference time unit, the sixth PMI is used to indicate a matrix $W_3$ corresponding to the first reference time unit and the second reference time unit, the second PMI is used to indicate a matrix $w_2^{(1)'}$ corresponding to the first reference time unit, the third PMI is used to indicate a matrix $w_2^{(2)'}$ corresponding to the second reference time unit, a precoding matrix corresponding to the first reference time unit satisfies $w^{(1)'}=w_1 \times w_2^{(1)'} \times w_3$, and a precoding matrix corresponding to the second reference time unit satisfies $w^{(2)'}=w_1 \times w_2^{(2)'} \times w_3$.

In one embodiment, the third PMI is used to indicate a relative amplitude value $\Delta p_{x,y,z}$, and the relative amplitude value $\Delta p_{x,y,z}$ is specifically used to represent a relative value between an amplitude coefficient $p_{x,y,z}^{(2)}$ in an (x×l+z)$^{th}$ row and a y$^{th}$ column in $w_2^{(2)'}$ and an amplitude coefficient $p_{x,y,z}^{(1)}$ at a corresponding location in $w_2^{(1)'}$; and/or the third PMI is used to indicate a relative phase value $\Delta c_{x,y,z}$, and the relative phase value $\Delta c_{x,y,z}$ is specifically used to represent a relative value between a phase coefficient $c_{x,y,z}^{(2)}$ in the $(x \times l+z)^{th}$ row and the $y^{th}$ column in $w_2^{(2)'}$ and a phase coefficient $c_{x,y,z}^{(1)}$ at a corresponding location in $w_2^{(1)'}$, where the matrices each are a matrix of 2l rows and columns, 1 and N" are both positive integers, x and z represent row numbers of $w_2^{(1)'}$ and $w_2^{(2)'}$, y represents column numbers of $w_2^{(1)'}$ and $w_2^{(2)'}$, $x \in \{0,1\}$, $z \in \{1,2,L,l\}$, and $y \in \{1,2,L,N"\}$.

In one embodiment, the third PMI is used to indicate a relative amplitude value $\Delta p_{x,y}$, and the relative amplitude value $\Delta p_{x,y}$ is specifically used to represent a relative value between an $\Delta p_{x,y}$, amplitude coefficient $p_{x,y}^{(2)}$ in an $(x+1)^{th}$ row and a $(y+1)^{th}$ column in $w_2^{(2)'}$ and an amplitude coefficient $p_{x,y}^{(1)}$ at a corresponding location in $w_2^{(2)'}$; and/or the third PMI is used to indicate a relative phase value $\Delta c_{x,y}$, and the relative phase value $\Delta c_{x,y}$ is specifically used to represent a relative value between a phase coefficient $c_{x,y}^{(2)}$ in the $(x+1)^{th}$ row and the $(y+1)^{th}$ column in $w_2^{(2)'}$ and a phase coefficient $c_{x,y}^{(1)}$ at a corresponding location in $w_2^{(1)'}$, where the matrices $w_2^{(1)'}$ and $w_2^{(2)'}$ each are a matrix of 2l rows and N" columns, 1 and N" are both positive integers, x represents row numbers of $w_2^{(1)'}$ and $w_2^{(2)'}$, y represents column numbers of $w_2^{(1)'}$ and $w_2^{(2)'}$, $x \in \{0,1L,2l-1\}$, and $y \in \{0,1,L,N"-1\}$.

In one embodiment, the receiving unit 520 is further configured to receive second CSI from the first communications apparatus, where the second CSI includes a second CQI, the second CQI is determined based on a matrix $W_2^{(q)}$ or $w_2^{(q)'}$ that corresponds to a time unit whose identifier is q, a precoding matrix corresponding to the time unit whose identifier is q satisfies $W^{(q)}=W_1 \times W_2^{(q)}$ or $w^{(q)'}=w_1 \times w_2^{(q)'} \times w_3$, the matrix $W_2^{(q)}$ is a matrix of 2l rows and N' columns, the matrix $w_2^{(q)'}$ is a matrix of 2l rows and N" columns, q is a positive integer greater than $m-n_1$ and $m-n_1-n_2$, and N' and N" are positive integers.

In one embodiment, $W_2^{(q)}$ is determined based on the second PMI, the third PMI, and an amplitude coefficient $p_{x,y',z}^{(q)}$ in an $(x \times l+z)^{th}$ row and a $y'^{th}$ column in $W_2^{(2)}$ and/or a phase coefficient $c_{x,y',z}^{(q)}$ in the $(x \times l+z)^{th}$ row and a $y'^{th}$ column in $W_2^{(2)}$, where $p_{x,y',z}^{(q)}$ and $c_{x,y',z}^{(q)}$ are calculated by using the following formulas:

$$p_{x,y',z}^{(q)} = p_{x,y',z}^{(1)} \times (\Delta p_{x,y',z})^Y, \text{ and } c_{x,y',z}^{(q)} = e^{j(\varphi_{x,y',z}^{(1)}+Y \times \Delta c_{x,y',z})},$$

where

Y represents a ratio of a difference between the identifier q and the identifier of the first reference time unit to a difference between the identifier of the first reference time unit and the identifier of the second reference time unit, and $y' \in \{1,2,L \ N'\}$.

In one embodiment, $\Delta p_{x,y,z}=p_{x,y,z}^{(1)}-p_{x,y,z}^{(2)}$, or $\Delta p_{x,y,z}=p_{x,y,z}^{(2)}-p_{x,y,z}^{(1)}$.

In one embodiment, $\Delta c_{x,y,z}=c_{x,y,z}^{(1)}-c_{x,y,z}^{(2)}$, or $\Delta c_{x,y,z}=c_{x,y,z}^{(2)}-p_{x,y,z}^{(1)}$.

In one embodiment, $W_2^{(q)}$ is determined based on the second PMI, the third PMI, and an amplitude coefficient $p_{x,y',z}^{(q)}$ in the $(x \times l+z)^{th}$ row and a $y'^{th}$ column in $W_2^{(q)}$ and/or a phase coefficient $c_{x,y',z}^{(q)}$ in the $(x \times l+z)^{th}$ row and a $y'^{th}$ column in $W_2^{(q)}$, where $p_{x,y',z}^{(q)}$ and $c_{x,y',z}^{(q)}$ are calculated by using the following formulas:

$$p_{x,y',z}^{(q)}=p_{x,y',z}^{(1)}+Y \times \Delta p_{x,y',z}, \text{ and}$$

$$p_{x,y',z}^{(q)}=p_{x,y',z}^{(1)}+Y \times \Delta p_{x,y',z}, \text{ where}$$

Y represents a ratio of a difference between the identifier q and the identifier of the first reference time unit to a difference between the identifier of the first reference time unit and the identifier of the second reference time unit, and $y' \in \{1,2,L \ N'\}$.

In one embodiment, the first CSI includes a fourth PMI and a fifth PMI. The fourth PMI is used to indicate the precoding matrix $w^{(1)}$ corresponding to the first reference time unit, and the fifth PMI is used to indicate the precoding matrix $w^{(2)}$ corresponding to the second reference time unit.

In one embodiment, the fifth PMI is used to indicate a relative coefficient value $\Delta w_{r,t}$ and the relative coefficient value $\Delta w_{r,t}$ is specifically used to represent a relative value between a coefficient $w_{r,t}^{(2)}$ in an $r^{th}$ row and a $t^{th}$ column in $w^{(2)}$ and a coefficient $w_{r,t}^{(1)}$ at a corresponding location in $w^{(1)}$, where the matrices $w^{(1)}$ and $w^{(2)}$ each are a matrix of $N_t$ rows and N columns, both $N_t$ and N are positive integers, r represents row numbers of $w^{(1)}$ and $w^{(2)}$, t represents column numbers of $w^{(1)}$ and $w^{(2)}$, $r \in \{1,2,L,N_t\}$, and $t \in \{1,2,L,N\}$.

In one embodiment, the sending unit 510 is further configured to send configuration information to the first communications apparatus, where the configuration information is used to indicate that the second CSI depends on the first CSI.

In one embodiment, the sending unit 510 is specifically configured to: send first indication information to the first communications apparatus, where the first indication information is used to indicate transmission of at least two reference signals; and send a first reference signal and a second reference signal to the first communications apparatus, where the first reference signal is used to measure the channel state in the first reference time unit, and the second reference signal is used to measure the channel state in the second reference time unit.

In one embodiment, the receiving unit 520 is further configured to receive second indication information from the first communications apparatus, where the second indication information is used to indicate whether the first CSI is available.

In one embodiment, for a periodic CSI reporting mode, the first CSI is sent by the first communications apparatus at a reporting moment in a first reporting periodicity, and the second CSI is sent by the first communications apparatus at a reporting moment in a second reporting periodicity, where the first reporting periodicity is greater than the second reporting periodicity.

In one embodiment, a value of $n_1$ is agreed on in a protocol or configured by the second communications apparatus for the first communications apparatus by using signaling; and/or a value of $n_2$ is agreed on in a protocol or configured by the second communications apparatus for the first communications apparatus by using signaling.

It should be understood that, the apparatus 500 herein is presented in a form of function units. The term "unit" herein may be an application-specific integrated circuit (ASIC), an electronic circuit, a processor (for example, a shared processor, a dedicated processor, or a group processor) configured to execute one or more software or firmware programs, a memory, a merged logic circuit, and/or another suitable component that supports the described function. In an optional example, a person skilled in the art may understand that the apparatus 500 may be specifically the second communications apparatus in the embodiment 200, and the apparatus 500 may be configured to perform procedures and/or operations corresponding to the second communications apparatus in the method embodiment 200. To avoid repetition, details are not described herein again.

Figure 6:
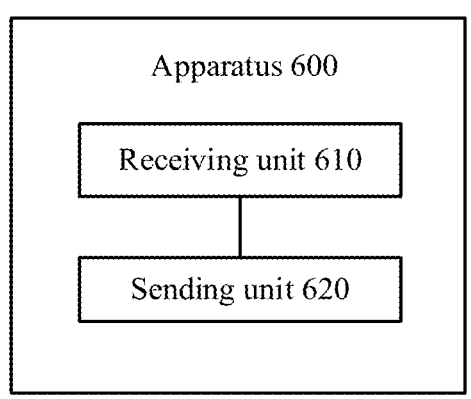
FIG. 6 is a schematic block diagram of another CSI reporting apparatus according to an embodiment of this application.

FIG. 6 shows another CSI reporting apparatus 600 according to an embodiment of this application. The apparatus 600 includes:

a receiving unit 610, configured to receive reference signals from a second communications apparatus; and a sending unit 620, configured to perform channel measurement based on the reference signals, and send third channel state information CSI to the second communications apparatus in a time unit whose identifier is K, where the third CSI is used to indicate a channel state in a third reference time unit, where an identifier of the third reference time unit is K+$n_3$, both K and $n_3$ are positive integers.

The CSI reporting apparatus in this embodiment of this application may feed back the third CSI to the second communications apparatus in the time unit whose identifier is K, where the third CSI indicates the channel state in the third reference time unit whose identifier is K+$n_3$, so that the second communications apparatus directly obtains a latest channel state. This helps improve a matching degree between CSI applied by the second communications apparatus and a channel that is at a current moment, thereby improving data transmission performance.

In one embodiment, the receiving unit 610 is specifically configured to: receive third indication information from the second communications apparatus, where the third indication information is used to indicate transmission of at least two reference signals; and receive a first reference signal and a second reference signal from the second communications apparatus based on the third indication information; and the apparatus further includes: a processing unit, configured to determine the third CSI based on the first reference signal and the second reference signal.

In one embodiment, the receiving unit 610 is further configured to receive fourth indication information, where the fourth indication information is used to indicate time domain positions of the at least two reference signals, and time domain positions of all of the at least two reference signals are different.

It should be understood that, the apparatus 600 herein is presented in a form of function units. The term "unit" herein may be an application-specific integrated circuit (ASIC), an electronic circuit, a processor (for example, a shared processor, a dedicated processor, or a group processor) configured to execute one or more software or firmware programs, a memory, a merged logic circuit, and/or another suitable component that supports the described function. In an optional example, a person skilled in the art may understand that the apparatus 600 may be specifically the first communications apparatus in the embodiment 300, and the apparatus 600 may be configured to perform procedures and/or operations corresponding to the first communications apparatus in the method embodiment 300. To avoid repetition, details are not described herein again.

Figure 7:
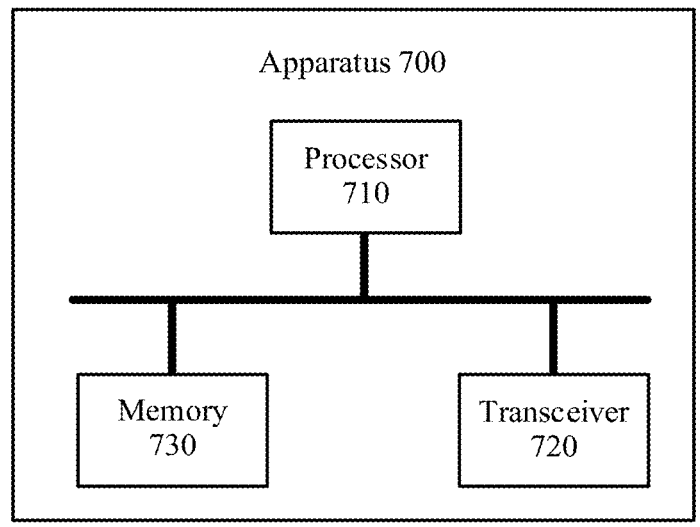
FIG. 7 is a schematic block diagram of another CSI reporting apparatus according to an embodiment of this application.

FIG. 7 shows another CSI reporting apparatus 700 according to an embodiment of this application. The apparatus 700 includes a processor 710, a transceiver 720, and a memory 730. The processor 710, the transceiver 720, and the memory 730 communicate with each other by using an internal connection path. The memory 730 is configured to store an instruction. The processor 710 is configured to execute the instruction stored in the memory 730, to control the transceiver 720 to send a signal and/or receive a signal.

The processor 710 is configured to: receive reference signals from a second communications apparatus by using the transceiver 720; and perform channel measurement based on the reference signals, and send first channel state information CSI to the second communications apparatus in a time unit whose identifier is m, where the first CSI is used to indicate a channel state in a first reference time unit and a channel state in a second reference time unit, where an identifier of the first reference time unit is m−$n_1$, an identifier of the second reference time unit is m−$n_1$−$n_2$, m, $n_1$, and $n_2$ are integers, and $n_2$ is not equal to 0.

It should be understood that, the apparatus 700 may be specifically the first communications apparatus in the embodiment 200, and may be configured to perform the operations and/or procedures corresponding to the first communications apparatus in the method embodiment 200. In one embodiment, the memory 730 may include a read-only memory and a random access memory, and provide an instruction and data to the processor. A part of the memory may further include a non-volatile random access memory. For example, the memory may further store information of a device type. The processor 710 may be configured to execute the instruction stored in the memory, and when the processor 710 executes the instruction stored in the memory, the processor 710 is configured to perform the operations and/or procedures of the method embodiment that correspond to the first communications apparatus.

Figure 8:
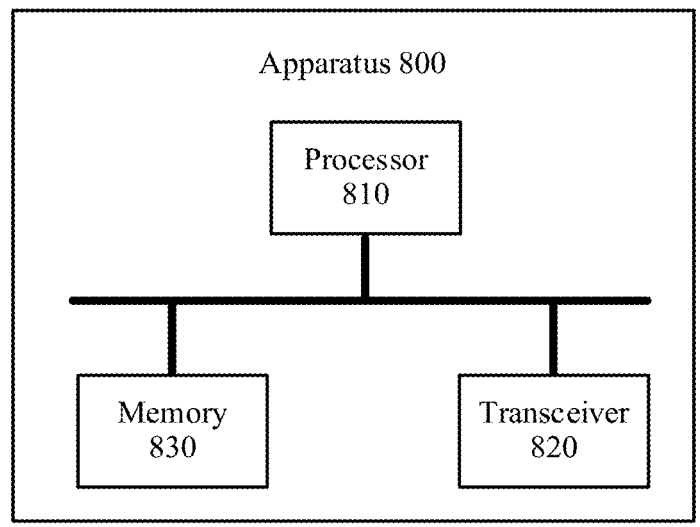
FIG. 8 is a schematic block diagram of another CSI reporting apparatus according to an embodiment of this application.

FIG. 8 shows another CSI reporting apparatus 800 according to an embodiment of this application. The apparatus 800 includes a processor 810, a transceiver 820, and a memory 830. The processor 810, the transceiver 820, and the memory 830 communicate with each other by using an internal connection path. The memory 830 is configured to store an instruction. The processor 810 is configured to execute the instruction stored in the memory 830, to control the transceiver 820 to send a signal and/or receive a signal.

The processor 810 is configured to: send reference signals to a first communications apparatus by using the transceiver 820; and receive first channel state information CSI that is sent by the first communications apparatus based on the reference signals in a time unit whose identifier is m, where the first CSI is used to indicate a channel state in a first reference time unit and a channel state in a second reference time unit, where an identifier of the first reference time unit is m−$n_1$, an identifier of the second reference time unit is m−$n_1$−$n_2$, and m, $n_1$, and $n_2$ are integers.

It should be understood that, the apparatus 800 may be specifically the second communications apparatus in the embodiment 200, and may be configured to perform operations and/or procedures corresponding to the second communications apparatus in the method embodiment 200. In one embodiment, the memory 830 may include a read-only memory and a random access memory, and provide an instruction and data to the processor. A part of the memory may further include a non-volatile random access memory. For example, the memory may further store information of a device type. The processor 810 may be configured to execute the instruction stored in the memory, and when the processor 810 executes the instruction stored in the memory, the processor 610 is configured to perform the operations and/or procedures of the method embodiment that correspond to the second communications apparatus.

Figure 9:
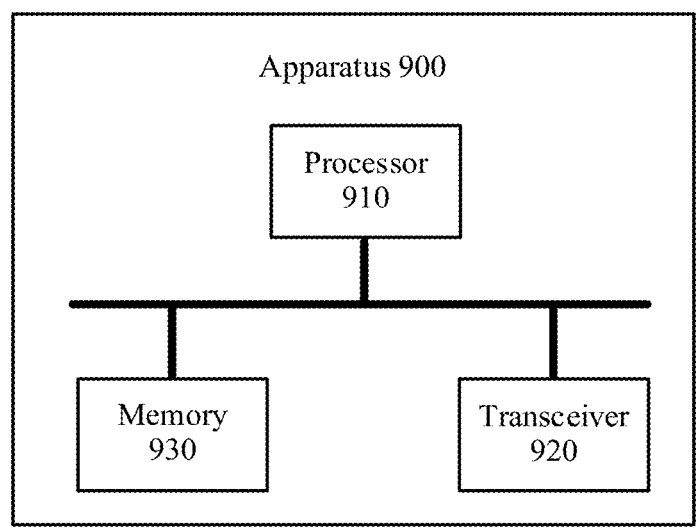
FIG. 9 is a schematic block diagram of another CSI reporting apparatus according to an embodiment of this application.

FIG. 9 shows another CSI reporting apparatus 900 according to an embodiment of this application. The apparatus 900 includes a processor 910, a transceiver 920, and a memory 930. The processor 910, the transceiver 920, and the memory 930 communicate with each other by using an internal connection path. The memory 930 is configured to store an instruction. The processor 910 is configured to execute the instruction stored in the memory 930, to control the transceiver 920 to send a signal and/or receive a signal.

The processor 910 is configured to: receive reference signals from a second communications apparatus by using the transceiver 920; and perform channel measurement based on the reference signals, and send third channel state information CSI to the second communications apparatus in a time unit whose identifier is K, where the third CSI is used to indicate a channel state in a third reference time unit, where an identifier of the third reference time unit is K+$n_3$, K is an integer, $n_3$ is a positive integer, and $n_2$ is not equal to 0.

It should be understood that, the apparatus 900 may be specifically the first communications apparatus in the embodiment 300, and may be configured to perform operations and/or procedures corresponding to the first communications apparatus in the method embodiment 300. In one embodiment, the memory 930 may include a read-only memory and a random access memory, and provide an instruction and data to the processor. A part of the memory may further include a non-volatile random access memory. For example, the memory may further store information of a device type. The processor 910 may be configured to execute the instruction stored in the memory, and when the processor 910 executes the instruction stored in the memory, the processor 910 is configured to perform the operations and/or procedures of the method embodiment that correspond to the first communications apparatus.

It should be understood that, in the embodiments of this application, the processor in the apparatus may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

In an implementation process, operations in the foregoing methods can be implemented by using a hardware integrated logical circuit in the processor or by using instructions in a form of software. The operations of the methods disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, a register, or the like. The storage medium is located in a memory, and the processor executes an instruction in the memory, and completes the operations in the foregoing methods in combination with hardware of the processor. To avoid repetition, details are not described herein again.

It should be understood that, the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method operations and units may be implemented by electronic hardware, computer software, or a combination thereof. To clearly describe the interchangeability between the hardware and the software, the foregoing has generally described operations and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that, the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A communications method, comprising:
   receiving, by a first communications apparatus, reference signals from a second communications apparatus; and
   performing, by the first communications apparatus, channel measurement based on the reference signals, and sending first channel state information (CSI) to the second communications apparatus in a time unit whose identifier is m, wherein the first CSI is used to indicate a channel state in a first reference time unit and a channel state in a second reference time unit, wherein
   an identifier of the first reference time unit is m—$n_1$, an identifier of the second reference time unit is m—$n_1$—$n_2$, wherein m, $n_1$, and $n_2$ are integers, and $n_2$ is not equal to 0.

2. The method according to claim 1, wherein the first CSI comprises a first precoding matrix indicator PMI, a second PMI, and a third PMI, wherein
   the first PMI is used to indicate a matrix $w_1$ corresponding to the first reference time unit and the second reference time unit, the second PMI is used to indicate a matrix $W_2^{(1)}$ corresponding to the first reference time unit, the third PMI is used to indicate a matrix $W_2^{(2)}$ corresponding to the second reference time unit, a precoding matrix corresponding to the first reference time unit satisfies $W^{(1)}=W_1 \times W_2^{(1)}$, and a precoding matrix corresponding to the second reference time unit satisfies $W^{(2)}=W_1 \times W_2^{(2)}$.

3. The method according to claim 2, wherein the third PMI is used to indicate a relative amplitude value $\Delta p_{x,y,z}$, and the relative amplitude value $\Delta p_{x,y,z}$ represents a relative value between an amplitude coefficient $p_{x,y,z}^{(2)}$ in an $(x \times l+z)^{th}$ row and a $y^{th}$ column in $W_2^{(2)}$ and an amplitude coefficient $p_{x,y,z}^{(1)}$ at a corresponding location in $W_2^{(1)}$; and/or
   the third PMI is used to indicate a relative phase value $\Delta c_{x,y,z}$, and the relative phase value $\Delta c_{x,y,z}$ represents a relative value between a phase coefficient $c_{x,y,z}^{(2)}$ in the $(x \times l+z)^{th}$ row and the $y^{th}$ column in $W_2^{(2)}$ and a phase coefficient $c_{x,y,z}^{(1)}$ at a corresponding location in $W_2^{(1)}$, wherein
   the matrices $W_2^{(1)}$ and $W_2^{(2)}$ each are a matrix of 2l rows and N columns, both l and N are positive integers, x and z represent row numbers of $W_2^{(1)}$ and $W_2^{(2)}$, y represents column numbers of $W_2^{(1)}$ and $W_2^{(2)}$, $x \in \{0, 1\}$, $z \in \{1,2,L,l\}$, and $y \in \{1,2,L,N\}$.

4. The method according to claim 1, wherein the first CSI comprises a first PMI, a second PMI, a third PMI, and a sixth PMI, wherein
   the first PMI is used to indicate a matrix $w_1$ corresponding to the first reference time unit and the second reference time unit, the sixth PMI is used to indicate a matrix $W_3$ corresponding to the first reference time unit and the second reference time unit, the second PMI is used to indicate a matrix $w_2^{(1)'}$ corresponding to the first reference time unit, the third PMI is used to indicate a matrix $w_2^{(1)'}$ corresponding to the second reference time unit, a precoding matrix corresponding to the first reference time unit satisfies $w^{(2)'}=w_1 \times w_2^{(1)'} \times w_3$, and a precoding matrix corresponding to the second reference time unit satisfies $w^{(1)'}=w_1 \times w_2^{(2)'} \times w_3$.

5. The method according to claim 4, wherein the third PMI is used to indicate a relative amplitude value $\Delta p_{x,y,z}$, and the relative amplitude value $\Delta p_{x,y,z}$ is used to represent a relative value between an amplitude coefficient $p_{x,y,z}^{(2)}$ in an $(x \times l+z)^{th}$ row and a $y^{th}$ column in $w_2^{(2)'}$ and an amplitude coefficient $p_{x,y,z}^{(1)}$ at a corresponding location in $w_2^{(2)'}$; and/or
   the third PMI is used to indicate a relative phase value $\Delta c_{x,y,z}$ and the relative phase value $\Delta c_{x,y,z}$ is used to represent a relative value between a phase coefficient $c_{x,y,z}^{(2)}$ in the $(x \times l+z)^{th}$ row and the $y^{th}$ column in $w_2^{(2)'}$ and a phase coefficient $c_{x,y,z}^{(1)}$ at a corresponding location in $w_2^{(2)'}$, wherein
   the matrices $w_2^{(1)'}$ and $w_2^{(2)'}$ each are a matrix of 2l rows and N" columns, l and N" are both positive integers, x and z represent row numbers of $w_2^{(1)'}$ and $w_2^{(2)'}$, y represents column numbers of $w_2^{(1)'}$ and $w_2^{(2)'}$, $x \in \{0, 1\}$, $z \in \{1,2,L,l\}$, and $y \in \{1,2,L,N"\}$.

6. The method according to claim 2, wherein the method further comprises:
   determining, by the first communications apparatus based on the second PMI and the third PMI, a matrix $W_2^{(q)}$ or $w_2^{(q)'}$ that corresponds to a time unit whose identifier is q, wherein a precoding matrix corresponding to the time unit whose identifier is q satisfies $W^{(q)}=W_1 \times W_2^{(q)}$ or $w^{(q)'}=w_1 \times w_2^{(q)'} \times w_3$, the matrix $W_2^{(q)}$ is a matrix of 2l rows and N' columns, the matrix $w_2^{(q)'}$ is a matrix of 2l rows and N" columns, q is a positive integer greater than m–$n_1$ and m–$n_1$–$n_2$, and N' and N" are positive integers;
   determining, by the first communications apparatus based on $W_2^{(q)}$ or $w_2^{(q)'}$, a second CQI in the time unit whose identifier is q; and
   sending, by the first communications apparatus, second CSI to the second communications apparatus, wherein the second CSI comprises the second CQI.

7. The method according to claim 6, wherein the method further comprises:
   receiving, by the first communications apparatus, configuration information from the second communications apparatus, wherein the configuration information is used to indicate that the second CSI depends on the first CSI; and
   the determining, by the first communications apparatus, based on the second PMI and the third PMI, a matrix $W_2^{(q)}$ or $w_2^{(q)'}$ that corresponds to a time unit whose identifier is q comprises: determining, by the first communications apparatus, $W_2^{(q)}$ or $w_2^{(q)'}$ based on the configuration information, the second PMI, and the third PMI.

8. The method according to claim 1, wherein before the receiving, by a first communications apparatus, reference signals from a second communications apparatus, the method further comprises:
   receiving, by the first communications apparatus, first indication information from the second communications apparatus, wherein the first indication information is used to indicate transmission of at least two reference signals; and
   the receiving, by a first communications apparatus, reference signals from a second communications apparatus comprises:
   receiving, by the first communications apparatus, a first reference signal and a second reference signal from the second communications apparatus based on the first indication information, wherein the first reference signal is used to measure the channel state in the first reference time unit, and the second reference signal is used to measure the channel state in the second reference time unit.

9. The method according to claim 1, wherein the method further comprises:
sending, by the first communications apparatus, second indication information to the second communications apparatus, wherein the second indication information is used to indicate whether the first CSI is available.

10. A channel state information CSI reporting method, comprising:
receiving, by a first communications apparatus, reference signals from a second communications apparatus; and
performing, by the first communications apparatus, channel measurement based on the reference signals, and sending third CSI to the second communications apparatus in a time unit whose identifier is K, wherein the third CSI is used to indicate a channel state in a third reference time unit, wherein
an identifier of the third reference time unit is $K+n_3$, K is an integer, and $n_3$ is a positive integer.

11. The method according to claim 10, wherein before the receiving, by a first communications apparatus, reference signals from a second communications apparatus, the method further comprises:
receiving, by the first communications apparatus, third indication information from the second communications apparatus, wherein the third indication information is used to indicate transmission of at least two reference signals;
the receiving, by a first communications apparatus, reference signals from a second communications apparatus comprises:
receiving, by the first communications apparatus, a first reference signal and a second reference signal from the second communications apparatus based on the third indication information; and
the method further comprises:
determining, by the first communications apparatus, the third CSI based on the first reference signal and the second reference signal.

12. A An apparatus, comprising:
at least one processor; and
a memory coupled to the at least one processor and having program instructions stored thereon which, when executed by the at least one processor, cause the apparatus to:
receive reference signals from a second communications apparatus; and
perform channel measurement based on the reference signals, and send first channel state information (CSI) to the second communications apparatus in a time unit whose identifier is m, wherein the first CSI is used to indicate a channel state in a first reference time unit and a channel state in a second reference time unit, wherein
an identifier of the first reference time unit is $m-n_1$, an identifier of the second reference time unit is $m-n_1-n_2$, wherein m, $n_1$, and $n_2$ are integers, and $n_2$ is not equal to 0.

13. The apparatus according to claim 12, wherein the first CSI comprises a first precoding matrix indicator (PMI), a second PMI, and a third PMI, wherein
the first PMI is used to indicate a matrix $w_1$ corresponding to the first reference time unit and the second reference time unit, the second PMI is used to indicate a matrix $W_2^{(1)}$ corresponding to the first reference time unit, the third PMI is used to indicate a matrix $W_2^{(2)}$ corresponding to the second reference time unit, a precoding matrix corresponding to the first reference time unit satisfies $W^{(1)}=W_1 \times W_2^{(1)}$, and a precoding matrix corresponding to the second reference time unit satisfies $W^{(2)}=W_1 \times W_2^{(2)}$.

14. The apparatus according to claim 13, the third PMI is used to indicate a relative amplitude value $\Delta p_{x,y,z}$, and the relative amplitude $\Delta p_{x,y,z}$ is used to represent a relative value between an amplitude coefficient $p_{x,y,z}^{(2)}$ in an $(x \times l+z)^{th}$ row and a $y^{th}$ column in $W_2^{(2)}$ and an amplitude coefficient $p_{x,y,z}^{(1)}$ at a corresponding location in $W_2^{(1)}$; and/or
the third PMI is used to indicate a relative phase value $\Delta c_{x,y,z}$, and the relative phase value $\Delta c_{x,y,z}$ is used to represent a relative value between a phase coefficient $c_{x,y,z}^{(2)}$ in the $(x \times l+z)^{th}$ row and the $y^{th}$ column in $W_2^{(2)}$ and a phase coefficient $c_{x,y,z}^{(1)}$ at a corresponding location in $W_2^{(1)}$, wherein
the matrices $W_2^{(1)}$ and $W_2^{(2)}$ each are a matrix of 2l rows and N columns, both l and N are positive integers, x and z represent row numbers of $W_2^{(1)}$ and $W_2^{(2)}$, y represents column numbers of $W_2^{(1)}$ and $W_2^{(2)}$, $x \in \{0, 1, L, l\}$, and $y \in \{1, 2, L, N\}$.

15. The apparatus according to claim 12, wherein the first CSI comprises a first PMI, a second PMI, a third PMI, and a sixth PMI, wherein
the first PMI is used to indicate a matrix $w_1$ corresponding to the first reference time unit and the second reference time unit, the sixth PMI is used to indicate a matrix $W_3$ corresponding to the first reference time unit and the second reference time unit, the second PMI is used to indicate a matrix $w_2^{(1)'}$ corresponding to the first reference time unit, the third PMI is used to indicate a matrix $w_2^{(2)'}$ corresponding to the second reference time unit, a precoding matrix corresponding to the first reference time unit satisfies $w^{(1)'}=w_1 \times w_2^{(1)'} \times w_3$, and a precoding matrix corresponding to the second reference time unit satisfies $w^{(2)'}=w_1 \times w_2^{(2)'} \times w_3$.

16. The apparatus according to claim 15, wherein the third PMI is used to indicate a relative amplitude value $\Delta p_{x,y,z}$, and the relative amplitude value $\Delta p_{x,y,z}$ is used to represent a relative value between an amplitude coefficient $p_{x,y,z}^{(2)}$ in an $(x \times l+z)^{th}$ row and a $y^{th}$ column in $w_2^{(2)'}$ and an amplitude coefficient $p_{x,y,z}^{(1)}$ at a corresponding location in $w_2^{(1)'}$; and/or
the third PMI is used to indicate a relative phase value $\Delta c_{x,y,z}$, and the relative phase value $\Delta c_{x,y,z}$ is used to represent a relative value between a phase coefficient $c_{x,y,z}^{(2)}$ in the $(x \times l+z)^{th}$ row and the $y^{th}$ column in $w_2^{(2)'}$ and a phase coefficient $c_{x,y,z}^{(1)}$ at a corresponding location in $w_2^{(2)'}$, wherein
the matrices $w_2^{(1)'}$ and $w_2^{(2)'}$ each are a matrix of 2l rows and N" columns, l and N" are both positive integers, x and z represent row numbers of $w_2^{(1)'}$ and $w_2^{(2)'}$, y represents column numbers of $w_2^{(1)'}$ and $w_2^{(2)'}$, $x \in \{0, 1\}$, $z \in \{1, 2, L, l\}$, and $y \in \{1, 2, L, N"\}$.

17. The apparatus according to claim 13, wherein the program instructions, when executed by the at least one processor, further cause the apparatus to:
determine, based on the second PMI and the third PMI, a matrix $W_2^{(q)}$ or $w_2^{(q)'}$ that corresponds to a time unit whose identifier is q, wherein a precoding matrix corresponding to the time unit whose identifier is q satisfies $W^{(q)}=W_1 \times W_2^{(q)}$ or $w^{(q)'}=w_1 \times w_2^{(q)'} \times w_3$, the matrix $W_2^{(q)}$ is a matrix of 2l rows and N' columns, the matrix $w_2^{(q)'}$ is a matrix of 2l rows and N" columns, q is a positive integer greater than $m-n_1$ and $m-n_1-n_2$, and N' and N" are positive integers;

determine, based on $W_2^{(q)}$ or $w_2^{(q)'}$, a second CQI in the time unit whose identifier is q; and send second CSI to the second communications apparatus, wherein the second CSI comprises the second CQI.

18. A communications method, comprising:

sending, by a second communications apparatus, reference signals to a first communications apparatus; and receiving, by the second communications apparatus, first channel state information (CSI) sent by the first communications apparatus based on the reference signals in a time unit whose identifier is m, wherein the first CSI is used to indicate a channel state in a first reference time unit and a channel state in a second reference time unit, wherein an identifier of the first reference time unit is m—$n_1$, an identifier of the second reference time unit is m—$n_1$—$n_2$, m, $n_1$, and $n_2$ are integers, and $n_2$ is not equal to 0.

19. The method according to claim 18, wherein the first CSI comprises a first precoding matrix indicator PMI, a second PMI, and a third PMI, wherein the first PMI is used to indicate a matrix $W_1$ corresponding to the first reference time unit and the second reference time unit, the second PMI is used to indicate a matrix $W_2^{(1)}$ corresponding to the first reference time unit, the third PMI is used to indicate a matrix $W_2^{(2)}$ corresponding to the second reference time unit, a precoding matrix corresponding to the first reference time unit satisfies $W^{(1)}=W_1 \times W_2^{(1)}$, and a precoding matrix corresponding to the second reference time unit satisfies $W^{(2)}=W_1 \times W_2^{(2)}$.

20. The method according to claim 19, wherein the third PMI is used to indicate a relative amplitude value $\Delta p_{x,y,z}$, and the relative amplitude value $\Delta p_{x,y,z}$ is specifically used to represent a relative value between an amplitude coefficient $p_{x,y,z}^{(2)}$ in an $(x \times 1+z)^{th}$ row and a $y^{th}$ column in $W_2^{(2)}$ and an amplitude coefficient $p_{x,y,z}^{(1)}$ at a corresponding location in $W_2^{(1)}$; and/or the third PMI is used to indicate a relative phase value $\Delta c_{x,y,z}$, and the relative phase value $\Delta c_{x,y,z}$ is specifically used to represent a relative value between a phase coefficient $\Delta c_{x,y,z}^{(2)}$ in the $(x \times 1+z)^{th}$ row and the $y^{th}$ column in $W_2^{(2)}$ and a phase coefficient $\Delta c_{x,y,z}^{(1)}$ at a corresponding location in $W_2^{(1)}$, wherein the matrices $W_2^{(1)}$ and $W_2^{(2)}$ each are a matrix of 21 rows and N columns, both 1 and N are positive integers, x and z represent row numbers of $W_2^{(1)}$ and $W_2^{(2)}$, y represents column numbers of $W_2^{(1)}$ and $W_2^{(2)}$, $x \in \{0,1\}$, $z \in \{1,2,\ldots,1\}$, and $y \in \{1,2,\ldots,N\}$.

21. The method according to claim 18, wherein the first CSI comprises a first PMI, a second PMI, a third PMI, and a sixth PMI, wherein the first PMI is used to indicate a matrix $W_1$ corresponding to the first reference time unit and the second reference time unit, the sixth PMI is used to indicate a matrix $W_3$ corresponding to the first reference time unit and the second reference time unit, the second PMI is used to indicate a matrix $W_2^{(1)'}$ corresponding to the first reference time unit, the third PMI is used to indicate a matrix $W_2^{(2)'}$ corresponding to the second reference time unit, a precoding matrix corresponding to the first reference time unit satisfies $W^{(1)'}=W_1 \times W_2^{(1)'} \times W_3$, and a precoding matrix corresponding to the second reference time unit satisfies $W^{(2)'}=W_1 \times W_2^{(2)'} \times W_3$.

22. The method according to claim 21, wherein the third PMI is used to indicate a relative amplitude value $\Delta p_{x,y,z}$, and the relative amplitude value $\Delta p_{x,y,z}$ is specifically used to represent a relative value between an amplitude coefficient $p_{x,y,z}^{(2)}$ in an $(x \times 1+z)^{th}$ row and a $y^{th}$ column in $W_2^{(2)'}$ and an amplitude coefficient $p_{x,y,z}^{(1)}$ at a corresponding location in $W_2^{(1)'}$; and/or the third PMI is used to indicate a relative phase value $\Delta c_{x,y,z}$, and the relative phase value $\Delta c_{x,y,z}$ is specifically used to represent a relative value between a phase coefficient $\Delta c_{x,y,z}^{(2)}$ in the $(x \times 1+z)^{th}$ row and the $y^{th}$ column in $W_2^{(2)'}$ and phase coefficient $c_{x,y,z}^{(1)}$ at a corresponding location in $W_2^{(1)'}$, wherein the matrices $W_2^{(1)'}$ and $W_2^{(2)'}$ each are a matrix of 21 rows and N" columns, 1 and N" are positive integers, x and z represent row numbers of $W_2^{(1)'}$ and $W_2^{(2)'}$, y represents column numbers of $W_2^{(1)'}$ and $W_2^{(2)'}$, $x \in \{0,1\}$, $z \in \{1,2,\ldots,1\}$, and $y \in \{1,2,\ldots,N"\}$.

23. An apparatus, comprising:

at least one processor; and a memory coupled to the at least one processor and having program instructions stored thereon which, when executed by the at least one processor, cause the apparatus to:

send reference signals to a first communications apparatus; and receive first channel state information (CSI) sent by the first communications apparatus based on the reference signals in a time unit whose identifier is m, wherein the first CSI is used to indicate a channel state in a first reference time unit and a channel state in a second reference time unit, wherein an identifier of the first reference time unit is m—$n_1$, an identifier of the second reference time unit is m—$n_1$—$n_2$, m, $n_1$, and $n_2$ are integers, and $n_2$ is not equal to 0.

24. The apparatus according to claim 23, wherein the first CSI comprises a first precoding matrix indicator PMI, a second PMI, and a third PMI, wherein the first PMI is used to indicate a matrix $W_1$ corresponding to the first reference time unit and the second reference time unit, the second PMI is used to indicate a matrix $W_2^{(1)}$ corresponding to the first reference time unit, the third PMI is used to indicate a matrix $W_2^{(2)}$ corresponding to the second reference time unit, a precoding matrix corresponding to the first reference time unit satisfies $W^{(1)}=W_1 \times W_2^{(1)}$, and a precoding matrix corresponding to the second reference time unit satisfies $W^{(2)}=W_1 \times W_2^{(2)}$.

25. The apparatus according to claim 24, wherein the third PMI is used to indicate a relative amplitude value $\Delta p_{x,y,z}$, and the relative amplitude value $\Delta p_{x,y,z}$ is specifically used to represent a relative value between an amplitude coefficient $p_{x,y,z}^{(2)}$ in an $(x \times 1+z)^{th}$ row and a $y^{th}$ column in $W_2^{(2)}$ and an amplitude coefficient $p_{x,y,z}^{(1)}$ at a corresponding location in $W_2^{(1)}$; and/or the third PMI is used to indicate a relative phase value $\Delta c_{x,y,z}$, and the relative phase value $\Delta c_{x,y,z}$ is specifically used to represent a relative value between a phase coefficient $c_{x,y,z}^{(2)}$ in the $(x \times 1+z)^{th}$ row and the $y^{th}$ column in $W_2^{(2)}$ and a phase coefficient $c_{x,y,z}^{(1)}$ at a corresponding location in $W_2^{(1)}$, wherein the matrices $W_2^{(1)}$ and $W_2^{(2)}$ each are a matrix of 21 rows and N columns, both 1 and N are positive integers, x and z represent row numbers of $W_2^{(1)}$ and $W_2^{(2)}$, y represents column numbers of $W_2^{(1)}$ and $W_2^{(2)}$, $x \in \{0,1\}$, $z \in \{1,2,\ldots,1\}$, and $y \in \{1,2,\ldots,N"\}$.

26. The apparatus according to claim 23, wherein the first CSI comprises a first PMI, a second PMI, a third PMI, and a sixth PMI, wherein the first PMI is used to indicate a matrix $W_1$ corresponding to the first reference time unit and the second reference time unit, the sixth PMI is used to indicate a matrix $W_3$ corresponding to the first reference time unit and the second reference time unit, the second PMI is used to indicate a matrix $W_2^{(1)'}$ corresponding to the first reference time unit, the third PMI is used to indicate a matrix $W_2^{(2)'}$ corresponding to the second reference time unit, a precoding matrix corresponding to the first reference time unit satisfies $W^{(1)'}=W_1 \times W_2^{(1)'} \times W_3$, and a precoding matrix corresponding to the second reference time unit satisfies $W^{(2)'}=W_1 \times W_2^{(2)'} \times W_3$.

27. The apparatus according to claim 26, wherein the third PMI is used to indicate a relative amplitude value $\Delta p_{x,y,z}$, and the relative amplitude value $\Delta p_{x,y,z}$ is specifically used to represent a relative value between an amplitude coefficient $P_{x,y,z}^{(2)}$ in an $(x \times l+z)^{th}$ row and a $y^{th}$ column in $W_2^{(2)'}$ and an amplitude coefficient $p_{x,y,z}^{(1)}$ at a corresponding location in $W_2^{(1)'}$; and/or the third PMI is used to indicate a relative phase value $\Delta c_{x,y,z}$, and the relative phase value $\Delta c_{x,y,z}$ is specifically used to represent a relative value between a phase coefficient $c_{x,y,z}^{(2)}$ in the $(x \times l+z)^{th}$ row and the $y^{th}$ column in $W_2^{(2)'}$ and a phase coefficient $c_{x,y,z}^{(1)}$ at a corresponding location in $W_2^{(1)'}$, wherein the matrices $W_2^{(1)'}$ and $W_2^{(2)'}$ each are a matrix of 2l rows and N" columns, l and N" are both positive integers, x and z represent row numbers of $W_2^{(1)'}$ and $W_2^{(2)'}$, y represents column numbers of $W_2^{(1)'}$ and $W_2^{(2)'}$, $x \in \{0,1\}$, $z \in \{1, 2, \ldots, l\}$, and $y \in \{1, 2, \ldots, N"\}$.

\* \* \* \* \*

UNITED STATES PATENT AND TRADEMARK OFFICE
CERTIFICATE OF CORRECTION

PATENT NO. : 11,290,164 B2
APPLICATION NO. : 16/943347
DATED : March 29, 2022
INVENTOR(S) : Zhang et al.

It is certified that error appears in the above-identified patent and that said Letters Patent is hereby corrected as shown below:

In the Claims

In Claim 3, Column 47, Line 50, "z∈{1,2,L,l}, and y∈{1,2,L,N}." should be -- $z \in \{1,2,\cdots,l\}$, and $y \in \{1,2,\cdots,N\}$. --.

In Claim 5, Column 48, Line 17, "z∈{1,2,L,l}, and y∈{1, 2,L,N"}." should be -- $z \in \{1,2,\cdots,l\}$, and $y \in \{1,2,\cdots,N''\}$. --.

In Claim 14, Column 50, Line 22, "z∈{1,2,L,l}, and y∈{1,2,L,N}." should be -- $z \in \{1,2,\cdots,l\}$, and $y \in \{1,2,\cdots,N\}$. --.

In Claim 16, Column 50, Line 55, "z∈{1,2,L,l}, and y∈{1, 2,L,N"}." should be -- $z \in \{1,2,\cdots,l\}$, and $y \in \{1,2,\cdots,N''\}$. --.

In Claim 22, Column 52, Line 16, "z∈{1,2,L,l}, and y∈{1,2,L,N}." should be -- $z \in \{1,2,\cdots,l\}$, and $y \in \{1,2,\cdots,N''\}$. --.

In Claim 25, Column 52, Line 64, "z∈{1,2,...,l}, and y∈{1,2,...,N"}." should be -- $z \in \{1,2,\cdots,l\}$, and $y \in \{1,2,\cdots,N\}$. --.

Signed and Sealed this
Second Day of August, 2022

*Katherine Kelly Vidal*

Katherine Kelly Vidal
*Director of the United States Patent and Trademark Office*